United States Patent [19]

Katada et al.

[11] Patent Number: 5,619,691
[45] Date of Patent: Apr. 8, 1997

[54] FILE SHARING METHOD AND SYSTEM FOR MULTIPROCESSOR SYSTEM

[75] Inventors: Hisashi Katada; Toshiaki Arai, both of Sagamihara; Yasufumi Yoshizawa, Tachikawa; Yoshitaka Ohfusa, Yokohama; Masayuki Kami, Fujisawa, all of Japan

[73] Assignees: Hitachi, Ltd., Tokyo; Hitachi Software Engineering Co., Ltd., Yokohama, both of Japan

[21] Appl. No.: 368,765

[22] Filed: Jan. 4, 1995

Related U.S. Application Data

[63] Continuation of Ser. No. 779,512, Oct. 18, 1991, abandoned.

[30] Foreign Application Priority Data

Oct. 19, 1990 [JP] Japan ................................. 2-279074

[51] Int. Cl.⁶ ....................................... G06F 17/30
[52] U.S. Cl. .................... 395/620; 395/200.03; 395/440; 395/670
[58] Field of Search .................... 395/400, 600, 395/650, 200.03, 440; 345/200

[56] References Cited

U.S. PATENT DOCUMENTS

| | | | |
|---|---|---|---|
| 4,399,504 | 8/1983 | Obermarck et al. | 345/650 |
| 4,819,159 | 4/1989 | Shipley et al. | 345/575 |
| 4,823,261 | 4/1989 | Bank et al. | 345/200 |
| 5,084,816 | 1/1992 | Boese et al. | 395/575 |
| 5,095,420 | 5/1992 | Eilert et al. | 345/400 |
| 5,237,668 | 8/1993 | Blandy et al. | 345/400 |
| 5,404,478 | 4/1995 | Arai et al. | 395/400 |
| 5,404,560 | 4/1995 | Lee et al. | 395/800 |

FOREIGN PATENT DOCUMENTS 62-145349   7/1987   Japan .

*Primary Examiner*—Thomas G. Black
*Assistant Examiner*—Paul R. Lintz
*Attorney, Agent, or Firm*—Fay, Sharpe, Beall, Fagan, Minnich & McKee

[57] ABSTRACT

A file sharing method and system for a multiprocessor system has an auxiliary storage unit that is shared in use by a plurality of processors each adopting virtual storage management. An auxiliary page table for storing on a page-by-page basis addresses of files contained in the auxiliary storage unit is prepared on a main storage provided for each of the processors. In response to a file map request issued by a program, an address of the file stored in said auxiliary storage unit is stored in the auxiliary page file. When the file is not stored in the main storage, a page exception interruption occurs, in response to which the address of the file stored in the auxiliary page table is referenced to for thereby transferring the file to the main storage from the auxiliary storage unit. The file stored in the auxiliary storage unit is transferred in the state undergoing an exclusion control.

2 Claims, 25 Drawing Sheets

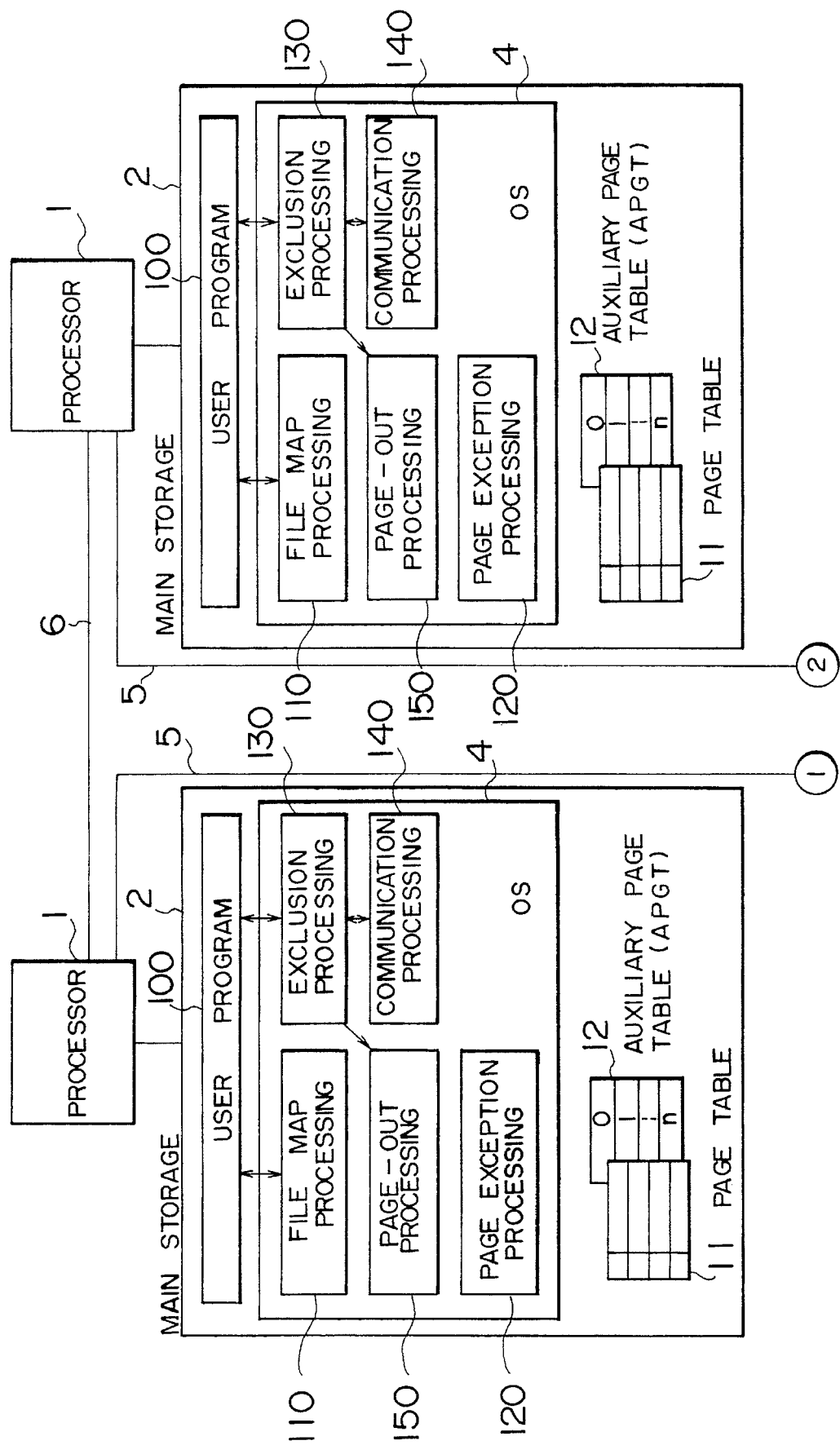

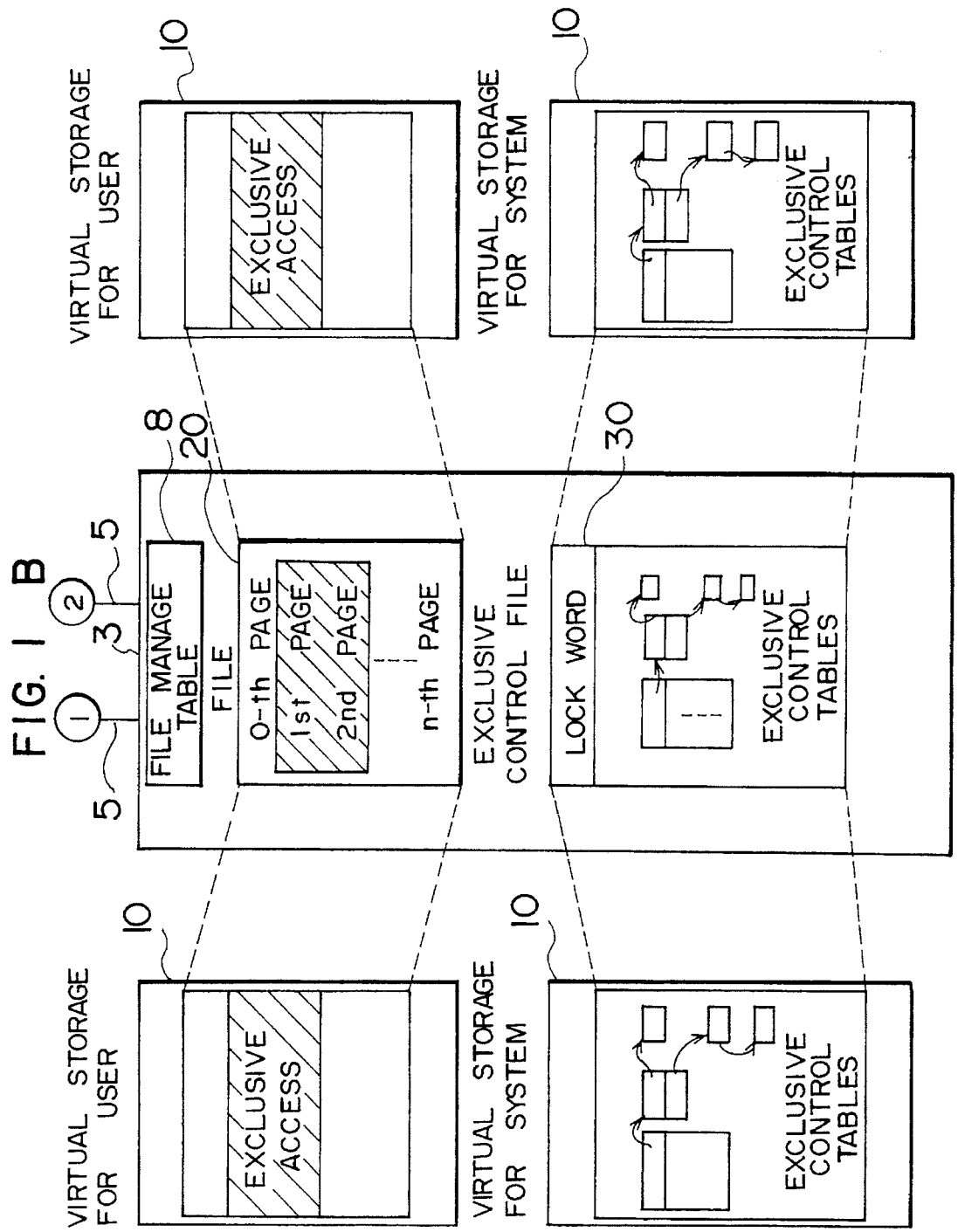

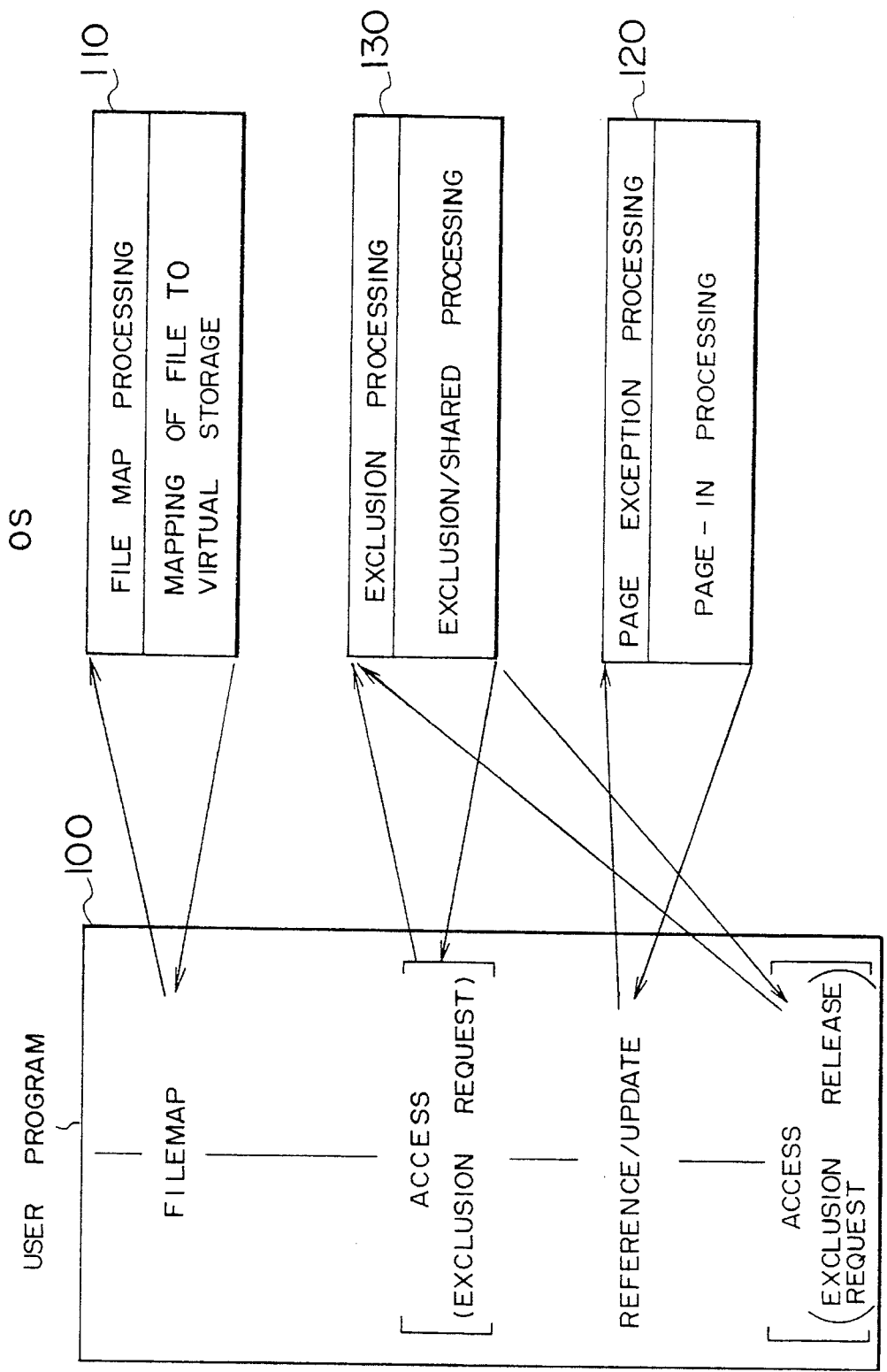

FIG. 4 A

FILEMAP FILE NAME, MAP ADDRESS, FILE-ID, OPTION

FILE NAME : (INPUT) NAME OF FILE TO BE MAPPED

MAP ADDRESS : (OUTPUT) VIRTUAL STORAGE ADDRESS WHERE FILE IS MAPPED

FILE-ID : (OUTPUT) INTEGER GENERATED IN ONE-TO-ONE CORRESPONDENCE TO FILE NAME

OPTION : (INPUT) COMMAND FOR WHOLE MAPPING / WINDOW MAPPING

FIG. 4 B

ACCESS FILE-ID, INTRA-FILE ADDRESS, LENGTH, EXCLUSION OPTION

FILE-ID : (INPUT) INTEGER GIVEN BY FILEMAP MACRO

INTRA-FILE ADDRESS : (INPUT) RELATIVE ADDRESS OF INTRA START FILES TO BE ACCESS

LENGTH : (INPUT) LENGTH OF AREA FOR ACCESS

EXCLUSION OPTION : (INPUT) COMMAND FOR EXCLUSION/ SHARED/RELEASE

FIG. 14

CSES REGISTER 1, REGISTER 2, REGISTER 3

REGISTER 1 : MAIN STORAGE ADDRESS (DATA BEFORE UPDATING)

REGISTER 2 : MAIN STORAGE ADDRESS (DATA AFTER UPDATING)

REGISTER 3 : MAIN STORAGE ADDRESS (ES LOCK WORD ADDRESS)

F I G. 15A

EXCLUSIVE ACCESS END TIME TABLE
( ON AUXILIARY STORAGE )

| | |
|---|---|
| 0 | EXCLUSIVE ACCESS END TIME |
| | ⋮ |
| n | EXCLUSIVE ACCESS END TIME |

35

F I G. 15B

PAGE-IN TIME TABLE ( ON MAIN STORAGE )

| | |
|---|---|
| 0 | PAGE-IN / UPDATE TIME |
| | |
| n | PAGE-IN / UPDATE TIME |

36

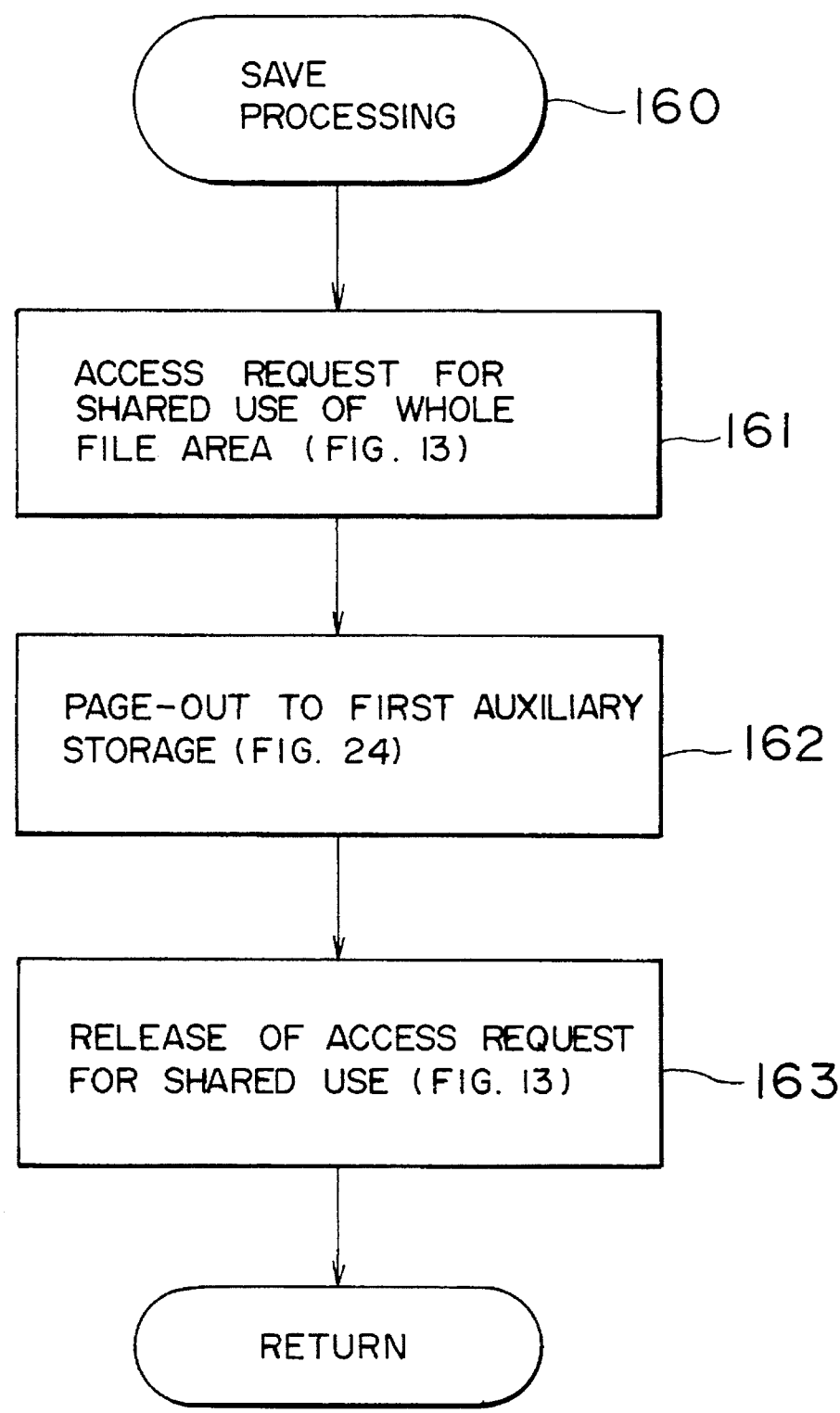

FILE SHARING METHOD AND SYSTEM FOR MULTIPROCESSOR SYSTEM

This is a continuation application of Ser. No. 07/779,512, filed Oct. 18, 1991 now abandoned.

BACKGROUND OF THE INVENTION

The present invention relates to a file accessing method and system in a computer system. More particularly, the present invention is concerned with a method and a system for making access to a file shared by a plurality of processors included in a multiprocessor system.

In general, in a computer system, an operating system (hereinafter referred to as OS for short) provides a file access macroinstruction so that a program running on the computer system can get rid of a burden of paying attention to a structure of an auxiliary storage unit in which files are stored.

It is sufficient for the program to have an input/output buffer disposed in a virtual area for issuing access macroinstructions (GET/PUT macros). Upon issuing of the access macroinstruction by a program, control is transferred to the OS (data manage part shown in FIG. 2), whereon the OS prepares a channel program suited to physical characteristics of the auxiliary storage unit. Further, the OS (hardware manage part and memory manage part shown in FIG. 2) fixes a page stored in a main storage and assigned to the input/output buffer and the channel program so that the page is not assigned to the other program and additionally translates a virtual address of the channel program to a real address, whereupon the channel is activated. This method is disclosed in Hajime Kamata's "TAJUU KASOU KIOKU OPEREITING SISUTEM (MULTIPLE VIRTUAL STORAGE OPERATING SYSTEM)", Ohm Company, PP. 81–95.

On the other hand, many large scale computer systems adopt a so-called loosely coupled multiple processor arrangement (hereinafter also referred to as LCMP for short) i.e. a multiprocessor system in which a plurality of individual processors are rather loosely coupled to one another. In an LCMP system, there will occur conflict or competition between programs running on the plural processors, respectively, in the access to a file. For evading such access competition, it is required to perform an exclusion control (or exclusion management, to say in another way) between the processors.

An exclusion manage or control method is disclosed in J-A-62-145349. According to this method, a given one of the processors is previously determined as a lock manager, wherein any other processor which desires to make access to a resource (file) issues to the lock manager a request for allowance of the access to the resource, whereon the former can proceed with processing in accordance with the response from the lock manager.

SUMMARY OF THE INVENTION

It is an object of the present invention to provide a file sharing method and a system which are capable of reducing overhead involved in making access to a file in a multiprocessor system.

Another object of the invention is to provide a file sharing method and a system in which competition control or exclusion management of the accesses to a shared file can be simplified with overhead involved being reduced.

The present invention starts from the recognition of the state of the art mentioned below.

The prior art system suffers from a problem that access to a shared file through a virtual area involves an increase in overhead. Besides, in the LCMP system, the exclusion management or exclusion control is required, as a result of which the time taken for the exclusion control (exclusion manage) processing is added as additional overhead when the prior art technique is applied.

In view of the above and other objects which will be apparent as description proceeds, it is proposed according to an aspect of the present invention that in a multiprocessor system in which a plurality of processors each adopting a virtual storage management share the use of an auxiliary storage unit, an auxiliary page table for holding addresses of the auxiliary storage unit where pages are located is prepared on a main storage of each processor. Upon occurrence of a file map request from a program, the address of the file in the auxiliary storage unit is placed in the auxiliary page table. In that case, when a page exception interruption takes place, the file is transferred to the main storage from the address of the auxiliary storage unit contained in the auxiliary page table.

With the arrangement described above, the auxiliary storage unit on which the pages are disposed can also be accessed without incurring competition, whereby the access requesting communication to the lock manager processor required heretofore upon every access can be rendered unnecessary.

Further, by placing the auxiliary pages in the main storage of each processor, overhead involved in the page read processing can be reduced.

Upon occurrence of a shared use request for a file from a given program, an exclusive control manage table is referred to. In that case, when the file is used exclusively by another program, the shared use request of the given program is suspended until the exclusive use of the file by the other program has been completed. On the other hand, upon occurrence of an exclusive use request for a file from a given program, the exclusive control manage table is referred to. When it is found that the abovementioned file is used exclusively by another program or alternatively used in a sharing mode, the exclusive use request of the given program is suspended until the file is released from the exclusive use or shared use. In this manner, such an unwanted situation can be evaded in which the given processor should read the file to thereby refer to inappropriate data in the course of the other processor writing data in the file.

Further, upon occurrence of an exclusive use release request from a program, content of a virtual storage is transferred to an area designated by an auxiliary storage address of the abovementioned page table, whereon a page cancel message is sent to the other processor. A processor receiving the page cancel message invalidates the relevant page table, whereby data read in the main storage in the preceding file reference can be discarded, thus allowing updated data to be read in the main storage by the page exception processing upon subsequent reference to the file.

In this way, the file access can be accomplished at a high speed while avoiding competition even in the LCMP system.

In an embodiment of the invention, it is preferred to use an extended storage unit capable of data transfer in synchronism with a processor. In that case, by disposing exclusive control (exclusive manage) information on the extended storage unit, the exclusive control processing can be speeded up, allowing the file access to be realized at a higher speed.

BRIEF DESCRIPTION OF THE DRAWINGS

The objects and features of the invention will better be understood from a detailed description of a preferred embodiment thereof, selected for purposes of illustration and shown in the accompanying drawings, in which:

FIG. 1 is a block diagram showing schematically a general arrangement of an LCMP system to which a file shaping concept of the present invention can be applied;

FIG. 3 is a diagram for illustrating interrelations and interactions between a user program and an OS;

FIGS. 4A and 4B are diagrams showing user interfaces according to the invention;

FIG. 14 is a view showing a specification of an exclusive control instruction for an extended storage;

FIG. 15A and 15B show structures of an update time table and a reference time table employed in the system shown in FIG. 1;

FIG. 26 is a flow chart for illustrating a save processing executed in the system shown in FIG. 21.

DESCRIPTION OF THE PREFERRED EMBODIMENTS

Figure 2:
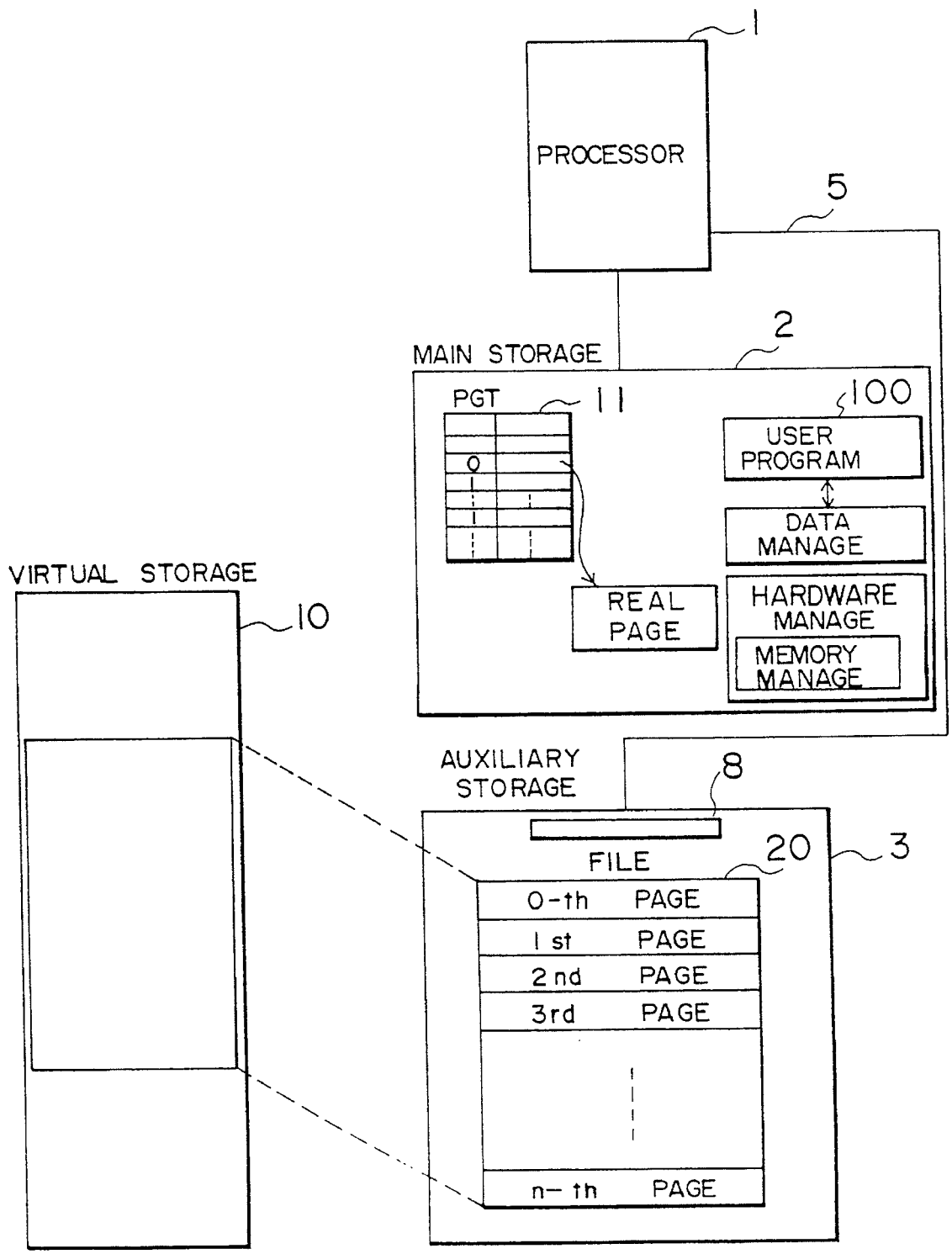
FIG. 2 is a view fop illustrating a prior art processor system.

The present invention will now be described in detail in conjunction with preferred or exemplary embodiments thereof by reference to the drawings.

FIG. 1 (formed of FIGS. 1-A and 1-B drawn of two sheets) is a block diagram showing schematically a general arrangement of a loosely coupled multiprocessor or LCMP system to which the present invention can be applied. Referring to the figure, the LCMP system includes a plurality of processors 1 each equipped with a main storage 2. An auxiliary storage unit 3 is provided so as to be shared in use by the plurality of processors 1. Further, the individual processors 1 are interconnected by a single channel 6.

Each of the main storages 2 stores a user program 100 and a system program (also known as operating system or OS for short) 4 which are executed by the associated processor 1. Details of the programs contained in the OS 4 will be described later. The main storage 2 additionally stores a page table 11 and an auxiliary page table 12. The page table 11 serves to store information indicating correspondence relations between virtual addresses and real addresses of the main storage 2. On the other hand, the auxiliary page table 12 stores information indicating correspondence relations between the virtual addresses and the real addresses of the auxiliary storage equipment or unit 3. Details of the page table 11 and the auxiliary page table 12 will be described hereinafter. Parenthetically, individual memory areas of the main storage 2 and the auxiliary storage unit 3 are managed on a page-by-page basis.

The auxiliary storage unit 3 stores a file 20, a file manage table 8 containing information or data for managing the file 20 and an exclusive control (exclusive management) file 30 for exclusive control or manage of the access made to the file 20.

With the structure mentioned above, the LCMP system operates in a manner as follows.

The user program 100 is executed on the virtual storage 10. (In this conjunction, it should be mentioned that the virtual storage represents a memory space for execution of a program which runs on the processor 1.) The user program 100 activates a file map processing program (hereinafter also referred to simply as the file map processing) 110 contained in the OS 4 to invalidate the correspondence relations between the virtual addresses of the page table 11 and the real addresses of the main storage 2 while allowing correspondence relations between the addresses (virtual addresses) of the virtual storage 10 and the real addresses of the auxiliary storage unit 3 to be stored in the auxiliary page table 12. The auxiliary page table 12 is provided on a page-by-page basis in correspondence to the virtual storage 10 of the user program 100 to contain the real addresses (page identifiers or numbers) of the auxiliary storage unit 3. The real address of the auxiliary storage unit is determined by reference to the file manage table 8 which is in charge of managing the file 20.

For simplification of the description which follows, three typical cases of operations will be considered, separately.

In a first typical case of operation, the user program 100 makes access to the virtual storage 10 (for the page which does not exist on the main storage 2) only after execution of the file map processing (program) 110.

When the user program 10 makes access to the page which is absent in the main storage 2 (i.e. the page which corresponds to the virtual address outputted from the user program 100 and is not placed in the main storage 2), it is then checked by reference to the page table 11 as to whether or not the page corresponding to the virtual address outputted by the user program 100 is present on the main storage 2. This check is performed by an address translation circuit (not shown) which is incorporated in the processor 1. In this case, since the abovementioned access is the first access to the virtual storage unit 10, it is apparent that no corresponding page exists on the main storage 2. At this time point, the address translation circuit issues an interruption. This interruption is referred to as the page exception interruption. Upon occurrence of the page exception interruption, a page exception processing program (also referred to as the page exception processing) 120 which is contained in the OS 4 is activated, for execution of the page exception processing 120, the auxiliary page table 12 is referred to in order to determine a real (page) address of the auxiliary storage unit 3 which corresponds to the page for which the page exception interruption has occurred (i.e. the page corresponding to the virtual address issued by the user program 100). Content of the real address of the auxiliary storage unit 3 as determined is then transferred to a blank or empty area of the main storage 2 on a page-by-page basis. Upon occurrence of this transfer, the real address (page address) of the main storage 2 for which the content is transferred from the auxiliary storage unit 3 is stored in a real address column of the page table 11, while the relation between the virtual address and the real address corresponding to each other is validated. Upon completion of the page exception processing (program) 120 executed in this manner, execution of the user program 100 is resumed. The access from the user program 100 is realized by reference to the correspondence relation between the virtual address placed in the page table 11 and the real address on the main storage 2. The address translation based on the page table 11 is executed by the address translation circuit mentioned previously.

A second typical operation is performed in the case in which the content corresponding to that of the virtual storage 10 accessed by the user program 100 exists on the main storage 2.

In this case, the access from the user program 100 is realized through the aforementioned address translation circuit by referring to the page table 11, as will be understood from the above description concerning the first typical operation.

In a third typical case of operation, the accesses each corresponding to that described hereinbefore in conjunction with the first typical case are issued by separate user programs running on the plural processors 1, respectively, wherein these accesses are destined to one and the same address (page) of the auxiliary storage unit 3. In the following description, it is assumed, by way of example only, that the LCMP system comprises two processors 1. In practice, however, control is performed to prevent this sort of event from taking place, as will be described below.

In precedence to making access to the virtual storage 10, the user program 100 issues a request for exclusive control (exclusive management) to the OS 4. In response to the request, an exclusive processing program (hereinafter also referred to simply as the exclusion processing) 130 contained in the OS 4 is activated. With the exclusive processing 130, an exclusion control (exclusive manage) file 30 stored in the auxiliary storage unit 3 is updated in accordance with the content of the exclusive control. Subsequently, the user program 100 makes access to the virtual storage 10. Upon completion of the access to the virtual storage 10, the user program 100 issues an exclusive control release request to the OS 4. In response to this request, the exclusive processing (program) 130 is activated to thereby update the exclusive control file 30 stored in the auxiliary storage unit 3. In this case, a page-out processing program (hereinafter also referred to simply as the page-out processing) 150 and a communication processing program (hereinafter also referred to simply as the communication processing) 140 may be executed, as occasion requires. Details of these processings will be explained later on.

In the foregoing, it has been assumed that the exclusive control file 30 is provided separately from the file 20. However, this is only for convenience of description. The exclusive control file 30 may be combined with the file 20 in the form of a unit file. Thus, it is possible to process the access to the exclusive control file 30 from the exclusive processing program 130 in a same manner as the access to the virtual storage. It should however be understood that although the exclusive control file 30 is provided for controlling the competition or conflict in the access to the file 20 from a plurality of the processors 1 (user programs 100), no file is provided for controlling the conflict in the access to the exclusive control file 30. As the information to this end, a lock word is provided within the exclusive control file. This lock word is set in response to the request for the exclusive control and the request for release therefrom and cleared upon completion of the processings involved in executing these requests. Concerning the relation between the exclusive control file 30 and the file 20, the former may be provided in correspondence to the latter or alternatively one exclusive control file 30 may be provided for a plurality of files 20 in common. In the latter case, the lock words may be provided in correspondence to the files 20, respectively, or alternatively one lock word may be provided in one of the exclusive control file 30.

The page-out processing (program) 150 serves to transfer the page having the content updated by the user program 100 from the main storage 2 back to the auxiliary storage unit 3 to be rewritten therein. Simultaneously with this processing, the page corresponding to the page table 11 may be invalidated. In the latter case, the communication processing (program) 140 described below is rendered unnecessary.

The communication processing 140 is to serve for informing or messaging to the other processor 1 that the page having the content updated by the user program 100 be invalidated. This message is transmitted via the signal channel 6. Upon reception of this message, the other processor 1 makes invalid the corresponding page within the page table, if present, through the communication processing 140.

An outline of operation of the LCMP system according to the illustrative embodiment of the invention has been described. Some supplementation will be helpful for understanding the invention.

The user program 100 is of such nature that once a given page has been secured in the main storage 2, instructions for which accesses are made to the addresses within one and the same page are executed in succession. Accordingly, executions of many access instructions are performed between a single exclusive control request and the request for release therefrom.

In the case of the embodiment now under consideration, processing is changed in dependence on whether the exclusive control request is to refer to a corresponding page or update that page, as will be described in detail later on.

Now, the instant embodiment will be elucidated more concretely.

FIG. 3 is a diagram for illustrating interrelations or interactions between the user program 100 and the OS 4. Referring to the figure, the user program 100 issues a file map macroinstruction FILEMAP for mapping a file to a virtual storage area 10 of the program. The OS 4 then executes the file map processing (program) 110 to perform the mapping of the file 20 to the virtual storage area 10.

Upon completion of the file mapping, the user program can make access to the mapped area.

In the first access, the page exception interruption takes place. By taking advantage of this page exception interruption, the OS 4 transfers a part of the file to the main storage. This is a main content of the page exception processing 120. Owing to this processing, the user program can make access to the file. When the file exists in the main storage, no page exception interruption takes place, allowing the program to make access to the file.

FIG. 4A is a view for illustrating a method of designating the file map macroinstruction FILEMAP. When this macroinstruction is executed with the name of a file to be accessed being designated in an operand, the OS 4 sends back to the user program a start address of the virtual storage area to which the file has been mapped. Accordingly, the user program can make access to any area in the file by making reference to an address resulting from addition of the start address mentioned above and intra-file offset.

Figure 5:
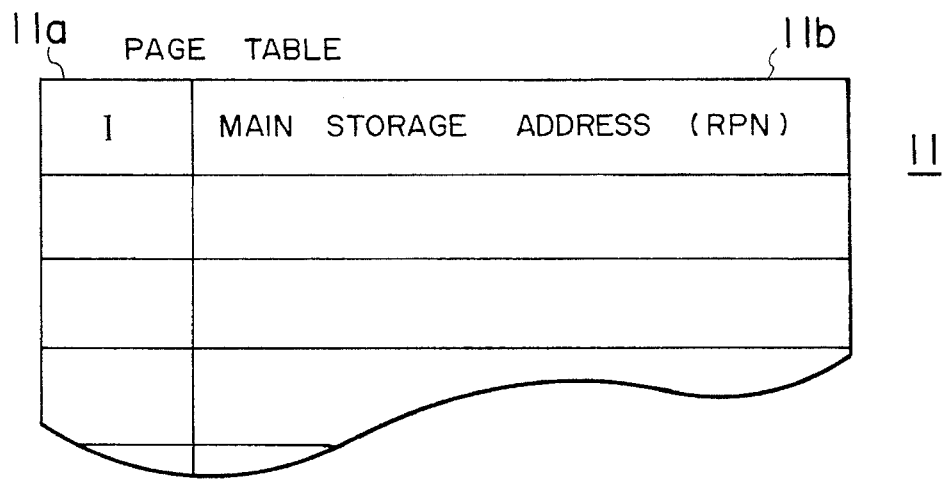
FIG. 5 shows a structure of a table referred to upon address translation.

Next, details of the instant embodiment will be described by reference to FIGS. 5 and 6 along with FIGS. 7 to 9.

At first, a method of address translation performed by hardware (address translation circuit) will be discussed briefly.

Turning back to FIG. 1, the virtual storage 10 and the main storage 2 are each divided into pages of a same size. The area on the main storage 2 where the file is stored is omitted from illustration. Mapping information for the mapping from the virtual storage 10 to the main storage 2 is placed in the page table 11. FIG. 5 shows a structure of the page table 11. As can be seen in this figure, the page table 11 includes an RPN field 11b for storing the main storage address and an I-bit field 11a indicating whether or not the RPN field 11b is valid. This page table 11 is prepared in correspondence to the virtual storage space.

Every time a program makes reference to the virtual storage or updates it, the hardware (i.e. the address translation circuit) consults the I-bit field 11a of the page table 11 corresponding to the address referred to or for updating, wherein when the I bit is "0", the main storage address is determined from the RPN field 11b. On the other hand, when the I-bit field 11a contains "1", the hardware or address translation circuit issues the page exception interruption, whereupon the control is transferred to the OS 4.

The OS 4 reads from the auxiliary storage unit into the main storage 2 the page to be stored in the auxiliary page table 12 corresponding to the address at which the page exception interruption has taken place. FIG. 6 shows a structure of the auxiliary page table 12, which is prepared in correspondence to the virtual storage space.

Figure 8:
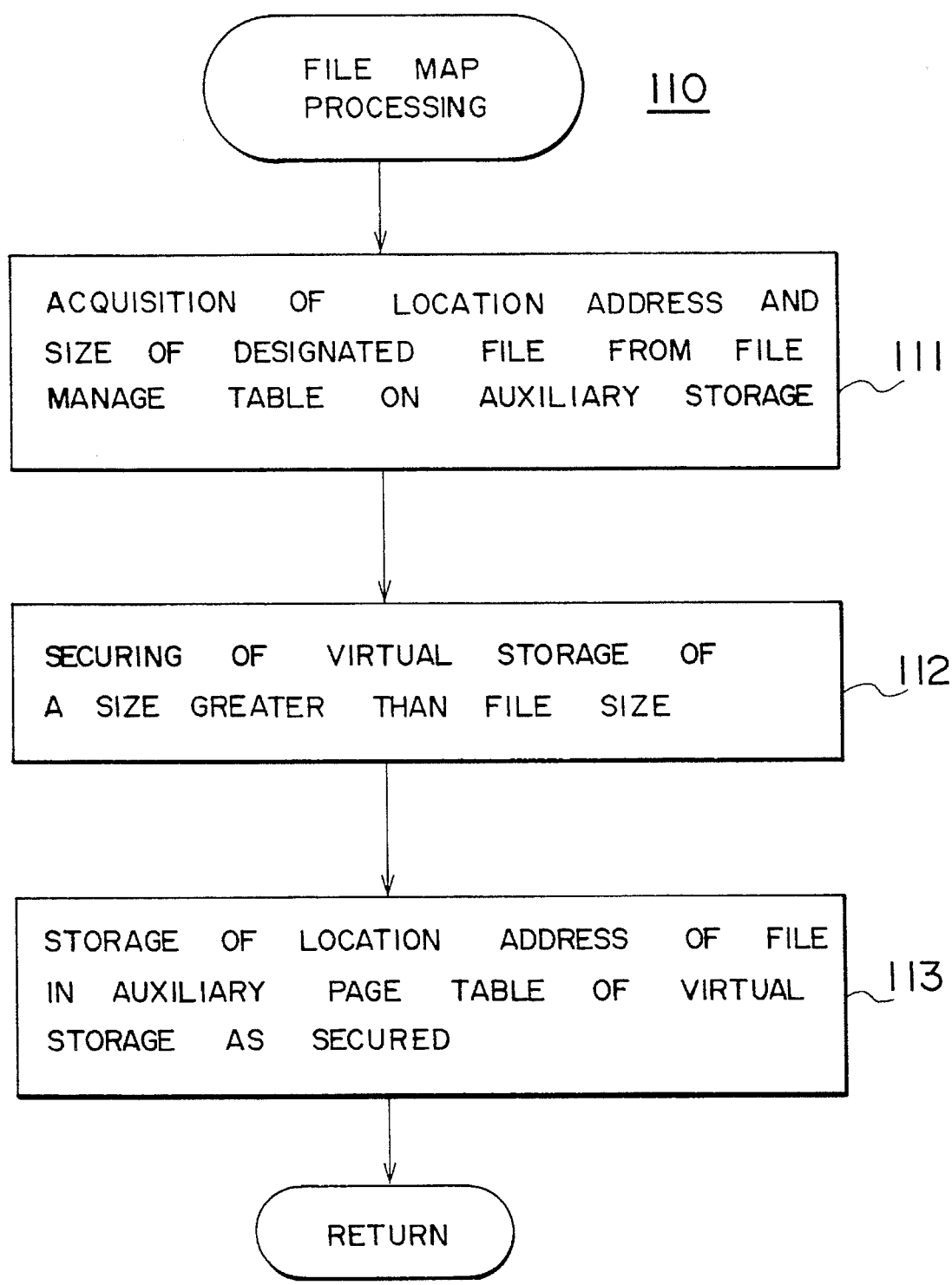
FIG. 8 is a Flow chart for illustrating a file map processing executed in the system shown in FIG. 1.

FIG. 8 is a flow chart for illustrating the file map processing (program) 110.

As described previously, the file map processing (program) 110 is activated when the user program 100 issues the macroinstruction FILEMAP.

Stored in the file manage table 8 on the auxiliary storage unit 3 are names of files and addresses at which the files are located. In the file map processing 110, the name designated by the operand of the macroinstruction FILEMAP is searched from the file manage table 8 to thereby determine the file location address and the file size (step 111). A virtual storage area not smaller than the file size as determined is secured (step 112), and the file location address is stored on the page-by-page basis in the auxiliary page table 12 corresponding to the virtual storage area as secured (step 113). The start address of the virtual storage area as secured is transferred to the user program which has issued the macroinstruction FILEMAP.

Figure 9:
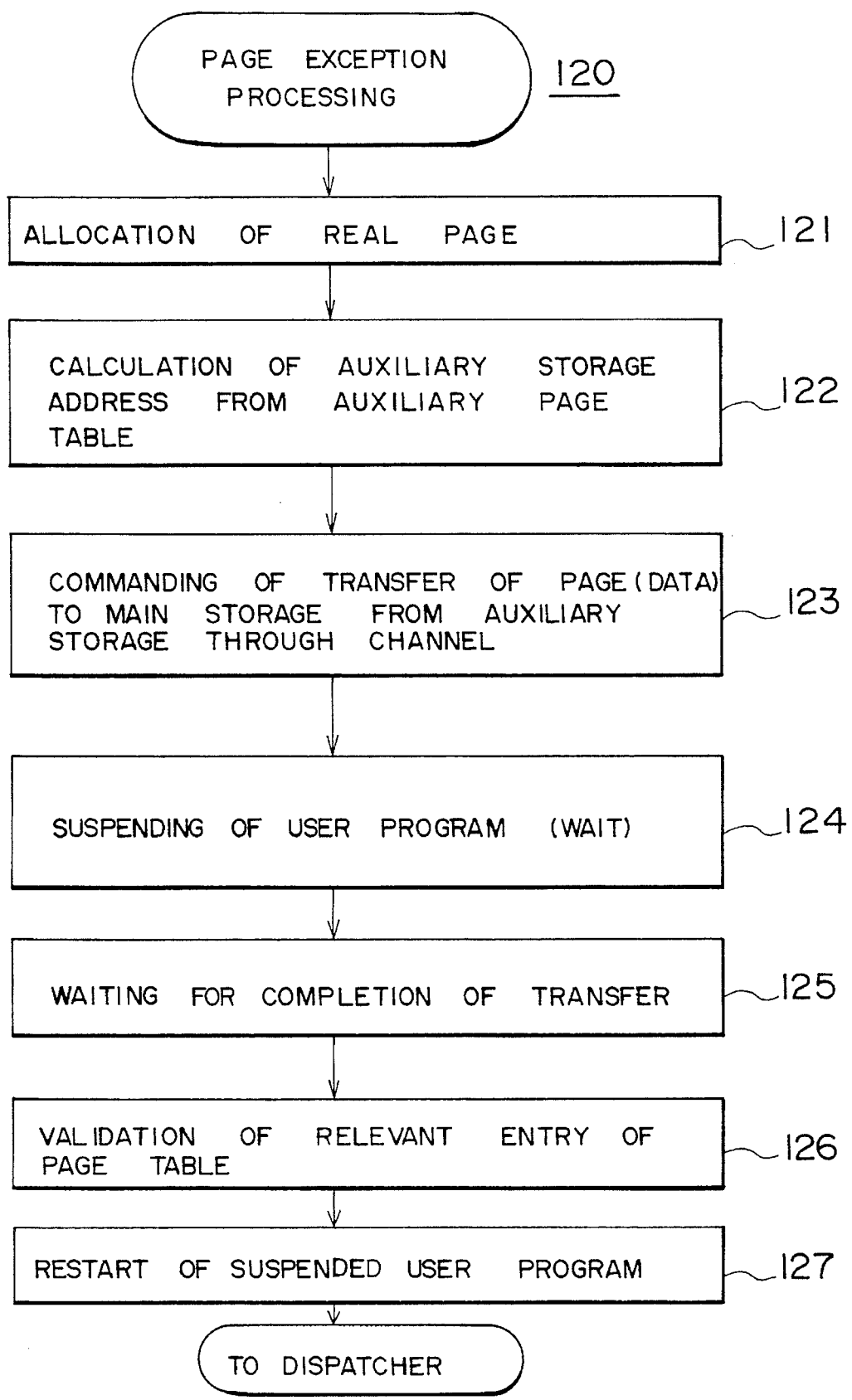
FIG. 9 is a Flow chart for illustrating a page exception processing executed in the system shown in FIG. 1.

FIG. 9 is a flow chart for illustrating the page exception processing (program) 120. Upon occurrence of the page exception interruption, a real page is secured on the main storage 2 (step 121). Subsequently, the auxiliary storage unit address is determined from the auxiliary page table 12 which corresponds to the address providing a cause for the occurrence of the page exception interruption (step 122). This address is the very one that has been stored at the step 113 mentioned above. This address is designated by a channel command to thereby activate the inputting of the file (step 123). Subsequently, the user program is set to the suspended state "WAIT" (step 124), whereon completion of the transfer is awaited (step 125). After the end of the transfer, the relevant entry of the page table is validated (step 126) to thereby allow execution of the user program to be restarted (step 127).

The number of the instructions to be executed by the page exception processing can be reduced when compared with the macroinstruction-activated file accessing method known heretofore.

Next, description will be directed to a method of allowing accesses to a shared file for updating thereof without incurring a conflict in the multiprocessor system.

Referring to FIG. 3 showing interrelations or interactions between the user program and the OS in the LCMP system according to the instant embodiment of the invention, the user program 100 issues a macroinstruction FILEMAP for mapping a file to its own virtual storage area 10. The OS executes the file map processing 110 to effect the mapping of the virtual storage 10 and the file 20.

The user program 100 issues a macroinstruction ACCESS in precedence to updating the mapped area (FIG. 3) and informs the OS 4 of updating the file 20. In response, the OS 4 transfers the control to the exclusive control processing (program) 130. The latter then makes reference to the exclusive control file 30 on the auxiliary storage unit 3, confirms that there is no program which uses the above-mentioned file 20 and transfers the control to the user program 100. In case there exists a program which is using the file 20, the relevant user program is set to the suspended state "WAIT" until there exists no program that uses the file 20.

The user program 100 is enabled to make access to the mapped area only after the macroinstruction ACCESS has been completed.

Since the first access is accompanied with occurrence of the page exception interruption, the OS transfers a part of the file to the main storage, as a result of which the user program can make access to the file. When the file exists on the main storage, no page exception takes place, allowing thus the user program to make immediate access to the file.

Upon completion of the access to the file, the user program 100 issues the macroinstruction ACCESS and informs the OS of completion of the file updating processing. The OS then activates the exclusive control processing.

The exclusive control processing 130 refers to the exclusive control file 30 on the auxiliary storage unit and messages completion of the access to another processor in case there exists a program which is suspended in accessing the file.

A method of designating the macroinstruction FILEMAP is illustrated in FIG. 4A. The name of the file to be accessed is designated in the operand field. When the macroinstruction FILEMAP is executed, the OS sends back the start address of the virtual storage where the file has been mapped together with the file identifier "file-id" determined definitely internally of the OS. The user program can now make access to any area by referring to an address corresponding to the abovementioned address added with the intra-file offset.

FIG. 4B is a view for illustrating a method of designating the macroinstruction ACCESS.

The file identifier "file-id" is the identification number which is transferred to the issuer. The OS then specifies the relevant file on the basis of this identification number.

The intra-file address and an offset are used for designating an area within the file which is to be referred to by the program.

An exclusive option function is provided for designating an exclusive use of an area designated or a shared use thereof with another user program or release of the exclusive use or the shared use. More specifically, for updating the file, the user program 100 issues a request for the exclusive use while it designates the shared use upon making reference to the file. Upon completion of the updating or the reference, a release request is issued.

Next, description in more detail will be made by referring to FIGS. 10 to 16.

Figure 10:
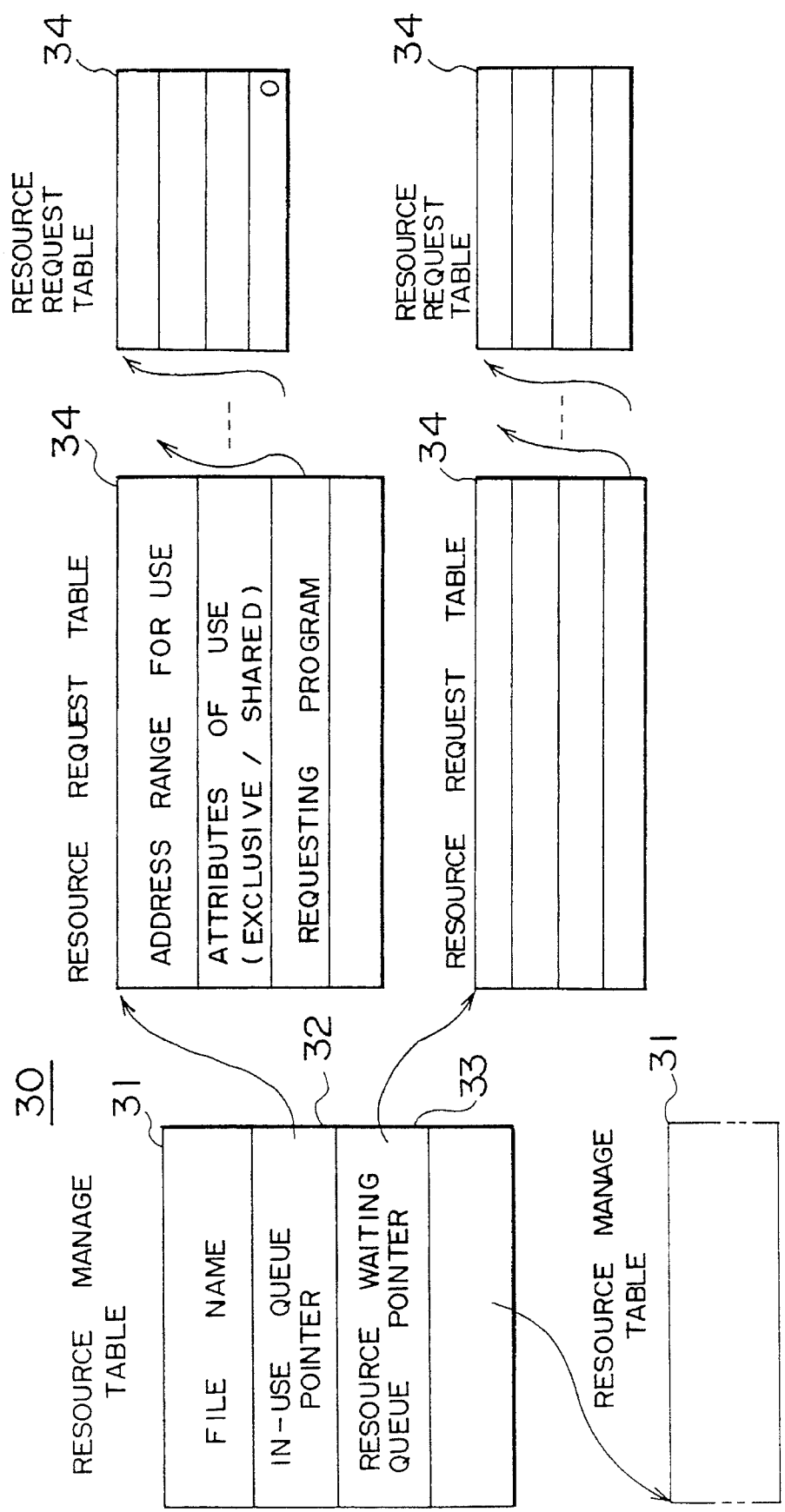
FIG. 10 shows a structure of an exclusive control manage table employed in the system shown in FIG. 1.

FIG. 10 shows a structure of an exclusive control manage table prepared in an exclusive control file 30. In the figure, 31 denotes a resource manage table and 34 denotes a resource request table.

The resource manage table 31 contains first and second pointers for pointing a file name and the resource request table 34, respectively. The first pointer is referred to as an in-use queue pointer 32 indicating the resource request table 34 which is using a file. The second pointer is referred to as a resource waiting queue pointer 33 indicating the resource request table 34 waiting for the use of a file. There are provided a number of the resource manage tables 31, which number is equal to that of the files used in the whole LCMP system.

The resource request table 34 includes an address range field containing a range of addresses of a file to be accessed, a request attribute field containing information concerning the shared use or the exclusive use, and a field of a request issuing program. The request issuing program field is composed of a string of the name of a program (or a task number and an address space number) which is issuing a request for use of a resource or which is using a resource and the OS identifier (or processor number).

Next, description will be directed to individual processings. Since the file map processing 110 and the page exception processing 120 have been described hereinbefore by reference to FIGS. 8 and 9, repetition thereof will be unnecessary.

Figure 11:
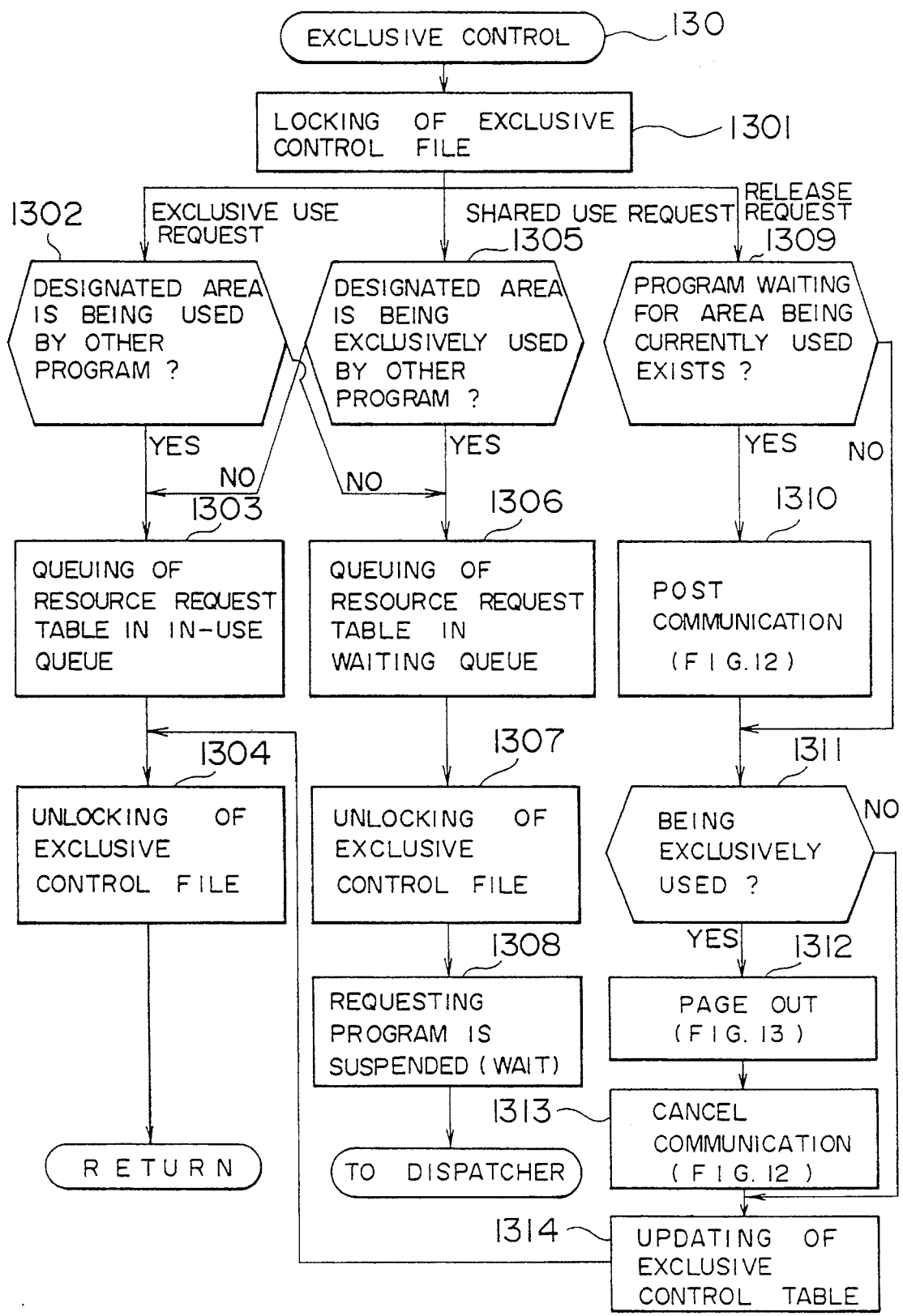
FIG. 11 is a flow chart for illustrating an exclusive control processing executed in the system shown in FIG. 1.

FIG. 11 is a flow chart for illustrating the exclusive control processing (program) 130.

The exclusive control processing 130 is activated in response to issuance of the macroinstruction ACCESS by the user program 100. The exclusive control processing 130 locks the exclusive control file 30 in order to prevent the exclusive control file 30 from being simultaneously updated by another program (step 1301). In the case of conventional disk equipment, the whole disk equipment is locked by issuing a reserve command. On the other hand, in the case of an extended storage unit having an exclusive control instruction, a lock word is prepared for the exclusive control file 30, wherein it is previously determined that the lock word having a value "0" indicates that a file of concern is not used while the other value of the lock word indicates that the file is being currently used. The lock word of "0" is rewritten for execution of the exclusive instruction. When the rewriting has ended successfully, execution proceeds to further processing. On the other hand, when the lock word assumes a value other than "0" or in case the rewriting has ended unsuccessfully, processing is suspended until the lock word assumes the value of "0".

FIG. 14 shows a specification of the exclusive control instruction. Referring to the figure, eight bytes of an extended storage address designated by a register 3 for a third parameter are compared with a first parameter (eight bytes) on the main storage. When coincidence is resulted from the comparison, a second parameter (eight bytes) on the main storage is stored at an extended storage address designated by an eighth parameter. When the above comparison results in discrepancy, no storage is performed in the extended storage but the discrepancy is reflected onto a condition code. Since a series of the processing steps mentioned above are executed in succession, any simultaneous attempt of another processor to update the extended storage address is inhibited until the instruction being currently executed has been completed.

Further, by providing the lock word for each of the resource manage tables 31, lock conflict or competition can be mitigated.

By using the extended storage as the auxiliary storage unit in this manner, the range for the lock can be narrowed, whereby overhead involved in the lock processing can significantly be reduced.

After having locked the exclusive control file 30, one of three processings described below is executed in dependence on the requests of the user program 100, which include the exclusive use request, the shared use request and the release request designated as the exclusive option by the macroinstruction ACCESS.

In the first place, description will be made of the processing executed in response to the exclusive use request.

In the exclusive control processing 130, the exclusive control file 30 is consulted for searching the name of the file to which an access request is issued from the resource manage table 31. Subsequently; the resource request table 34 is referenced with the aid of the in-use queue pointer to check whether there is a program which is using a file area designated by the macroinstruction ACCESS (step 1302). In case no program is found which is using the file area of concern, a resource request table 34 is prepared and entries as required are placed therein, whereon the address of the aforementioned resource request table 34 is stored in the in-use queue pointer 32 of the resource manage table 31 (step 1303). Thereafter, the exclusive control file is unlocked (step 1304), whereon control is transferred back to the user program 100.

When it is found at the step 1302 that there exists a program which is using the file area of concern, the resource request table 34 is prepared with entries as required being stored therein, whereon the address of the abovementioned resource request table 34 is set at the waiting queue pointer 33 of the resource manage table 31 (step 1306).

Subsequently, the exclusive control file 30 is unlocked (step 1307). The user program 100 is suspended till completion of the file reference which is currently being performed by a program (step 1308).

The processing executed upon occurrence of the exclusive use request will now be understood from the above. Next, description will be directed to the processing executed upon issuance of the shared use request.

In the case of the shared use request, a file which is being used by a program can be shared by another program. Of course, if the file is used exclusively by the former, it is necessary to make a program issuing the shared use request be suspended or waited for. Accordingly, it is checked at a step 1305 whether or not a file of concern is used exclusively by any program. In case the file is exclusively used, processing succeeding to a step 1306 inclusive is executed for suspending a program issuing the shared use request. On the other hand, unless the file is used exclusively by any program, processing succeeding to the step 1303 is executed, upon completion of which the control is transferred back to the user program 100.

Next, description will be turned to the processing executed in response to the release request.

At first, the exclusive control file 30 is consulted to search the resource manage table 31 containing a same file name as that of the file which is currently being used and then searches the resource request table 34 containing the area being used by the user program 100 issuing currently the request from the waiting queue pointer 33 (step 1309). When the resource request table 34 is found, post-communication processing (POST) is performed for the request issuer stored in this resource request table 34 to allow the request issuing program to be activated (step 1310).

In case the resource manage table could not be found at the step 1309 or when the post-communication processing (1310) has been carried out, it is then checked whether or not the request-issued user program 100 is using the file exclusively (step 1311).

When the file is being exclusively used, a page-out processing (step 1312) and a cancel communication processing (step 1313) are executed, whereon the updated page is written back in the file 20, while discarding the content in the same file area on the other main storage, to thereby ensure consistency of the file content distributed to the individual main storages. The page-out processing and the cancel communication processing will be described in detail later.

After having executed these processings, the resource request table 34 of the request issuer is deleted from the in-use queue of the resource manage table 31 (step 1314).

Thereafter, the exclusive control file is unlocked (step 1304), whereon the control is transferred back to the user program 100.

Figure 12A:
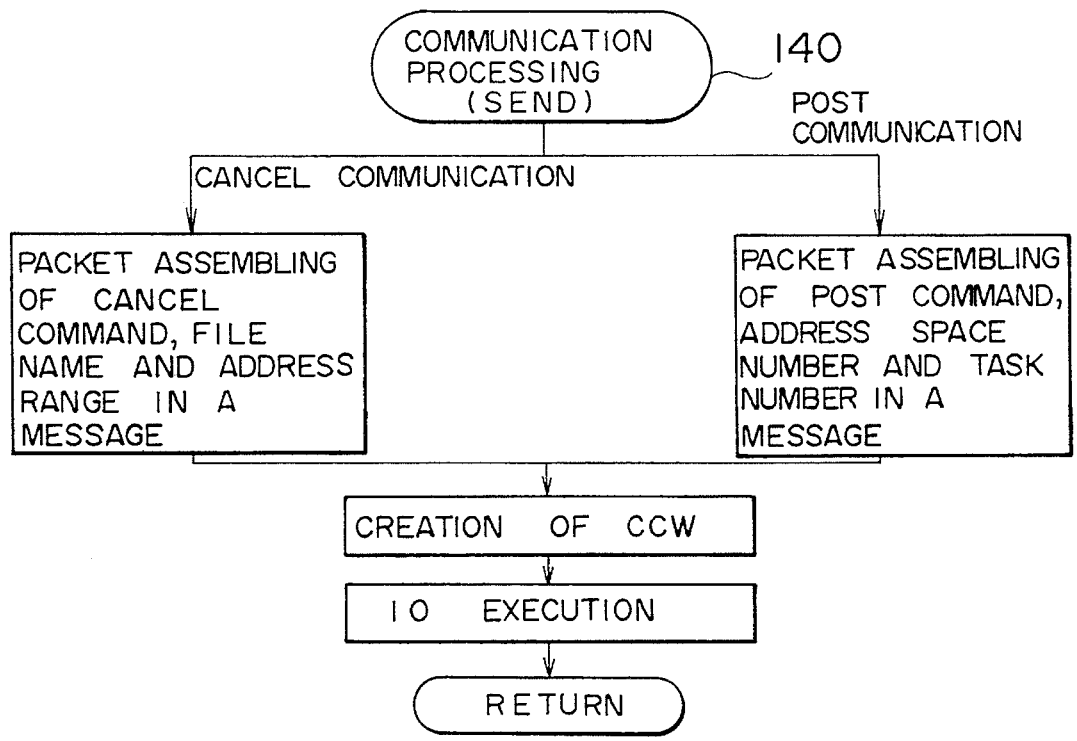
FIGS. 12A and 12B are flow charts for illustrating communication processings in the system shown in FIG. 1.
Figure 12B:
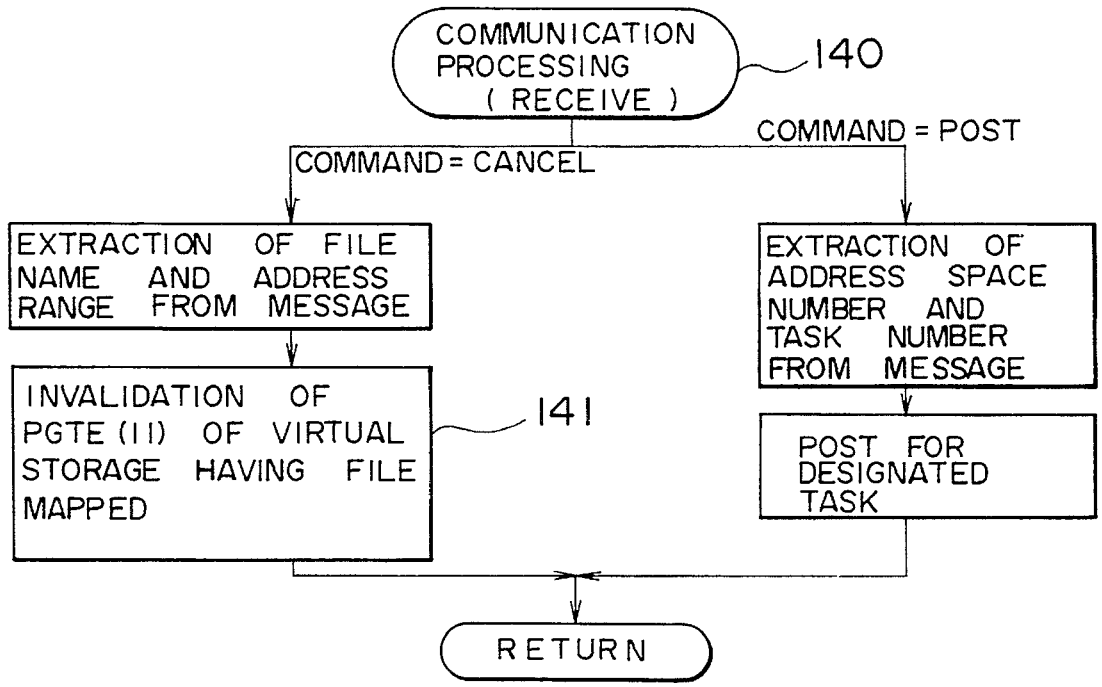

Next, referring to FIGS. 12A and 12B, description will be made of the cancel communication processing and the post-communication processing.

Upon reception of the cancel communication request (FIG. 12A), a communication processing (program) 140 assembles a cancel command, a file name and an intra-file address range into a message, whereupon an output request is issued to the inter-processor communication channel 6. The inter-processor communication channel 6 issues an interruption to a destination processor to thereby store the contents of the message in the main storage 2.

In response to the interruption request through the inter-processor communication channel 6, the OS activates a communication processing (reception) program 140. With the communication processing 140, the file name and the intra-file address range are extracted from the message because of the cancel command, whereon the I-bit field 11a of the page table entry 11 of the virtual storage having the file mapped is set to "0" (step 141).

As a result of this, when a program makes reference to the canceled virtual storage area, there takes place a page exception. Thus, the file is read out from the auxiliary storage unit. At that time, the file has a content updated most recently.

On the other hand, in the post-communication processing (FIG. 12A), information of the command POST, address space number and the task number which specifies the destination program is stored in a message, whereupon the inter-processor communication channel 6 is activated. As in the case of the cancel communication processing, interruption is issued to the destination processor, and then the communication processing (reception processing) 140 (FIG. 12B) is activated. Since the command is POST in this communication processing (reception), a program is specified from the content of the message to thereby set the program to POST which then activates the program suspended in the waiting state by the command WAIT.

Figure 13:
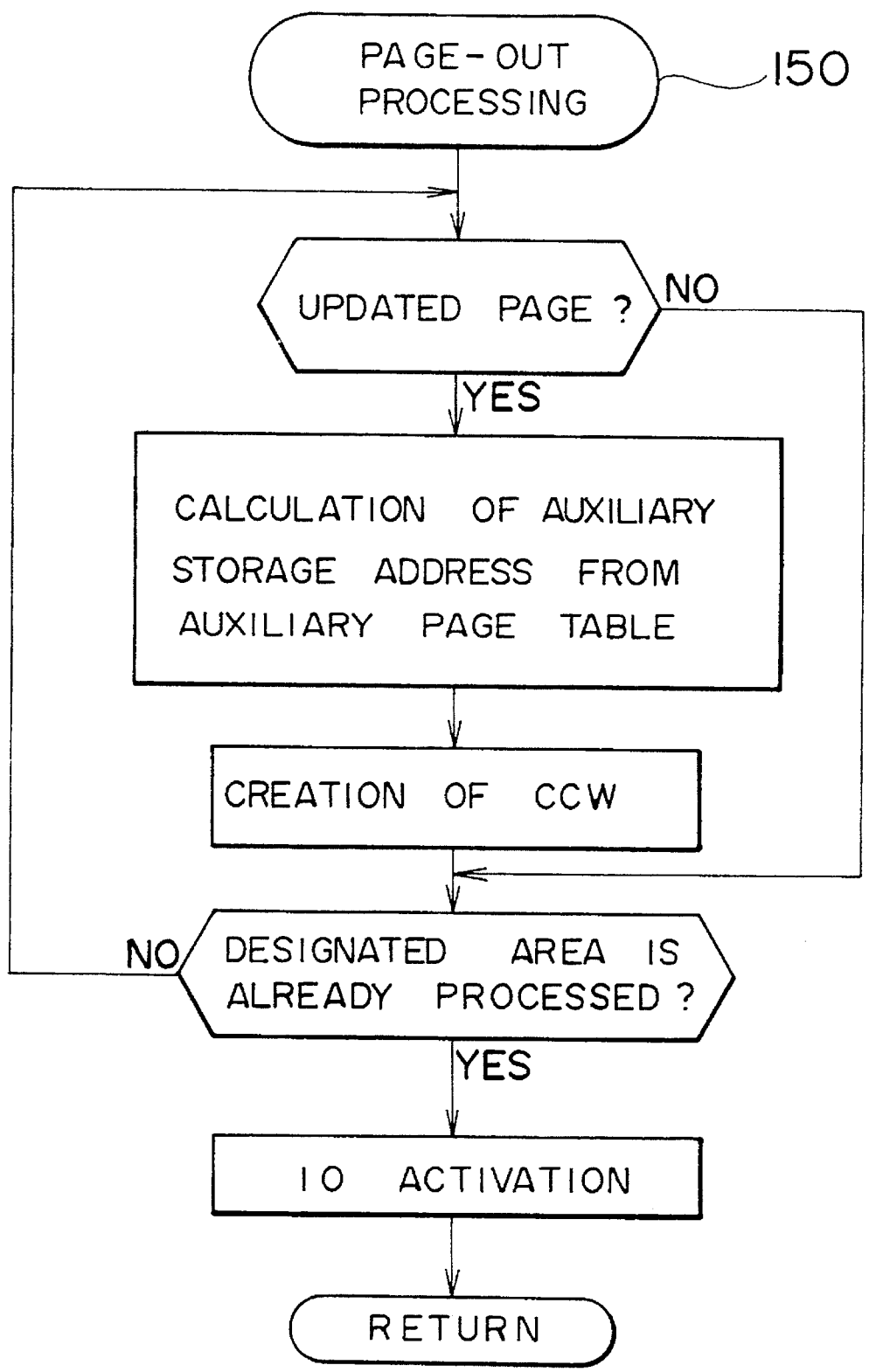
FIG. 13 is a flow chart for illustrating a page-out processing executed in the system shown in FIG. 1.

FIG. 13 is a flow chart for illustrating a page-out processing (program) 150. Through this processing, the updated page is transferred to the auxiliary storage address which is to be stored in the auxiliary page table 12.

According to the teachings of the invention incarnated in the instant embodiment, it is possible in the file sharing LCMP system to make access to a file for updating thereof at a high speed without incurring competition or conflict in the access.

FIGS. 15 to 18 show another embodiment of the present invention.

According to this embodiment, there are provided in combination an exclusive control (exclusive manage) processing program 130a and a page exception processing program 120a for the purpose of making unnecessary the cancel communication processing upon releasing of the exclusive use to thereby decrease the number of instructions to be executed.

FIGS. 15A and 15B show a structure of an exclusive access end time table 35 prepared in the exclusive control file 30 shown in FIG. 1 and a structure of a page-in time table 36 prepared in each of the main storages 2 shown in FIG. 1, respectively.

Each of these tables 35 and 36 includes the same number of entries as the page number of the file 20 mapped to the virtual storage 10.

In the exclusive access time table 35, there is recorded temporal or time information indicating the time point when the exclusive use release request is issued every time the page is updated.

On the other hand, there are recorded in the page-in time table 36 a time point at which a page is read out from a file in each processor and a time point at which the page is written back in the file.

Figure 16:
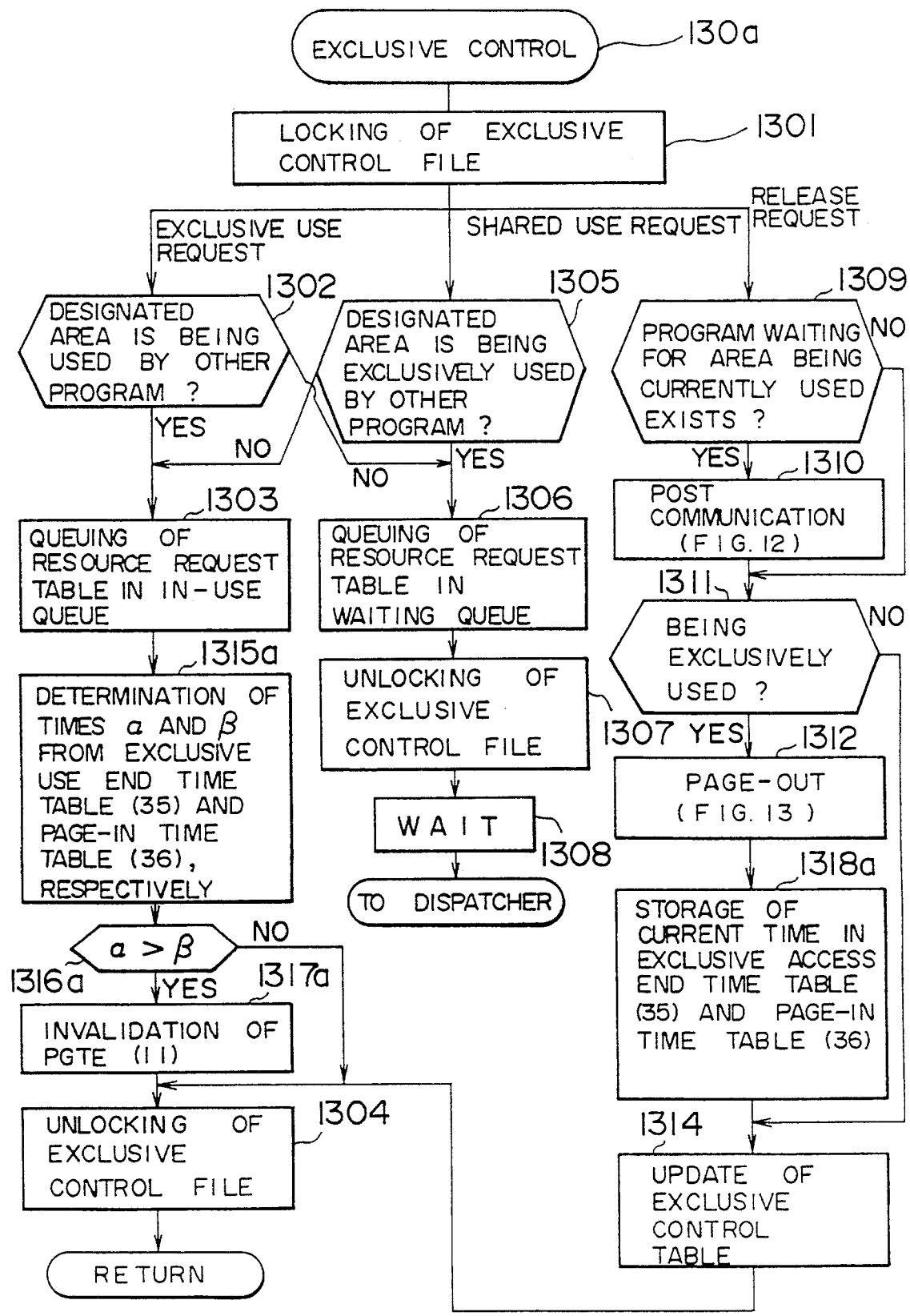
FIG. 16 is a flow chart for illustrating another example of exclusive control processing executed in the system shown in FIG. 1.

FIG. 16 is a flow chart for illustrating an exclusive control processing program 130a in the system according to the instant embodiment now under consideration.

In FIG. 16, like reference symbols as those used in FIG. 11 denote same steps.

In the following, only those processing steps differing from the ones shown in FIG. 11 will be described.

Upon releasing of the exclusive use, the updated page is written back into the file (step 1312), whereon the time at which the above event takes place is written at corresponding entries in the exclusive access end table 35 and the page-in time table 36 on the exclusive control file 30.

In case the file access is allowable upon user request for the exclusive or shared use of a file, the exclusive access end time ($\alpha$) is determined from the exclusive access end time table 35 on the exclusive control file 30 while the page-in time ($\beta$) is determined from the page-in time table 36 on the main storage (step 1318a). When $\alpha > \beta$, indicating that the content of the main storage is older than that of the file 20 (step 1316a), the I-bit field 11a of the page table 11 of the associated processor is set to "0" (step 1317a), to thereby invalidate the relevant page.

Figure 17:
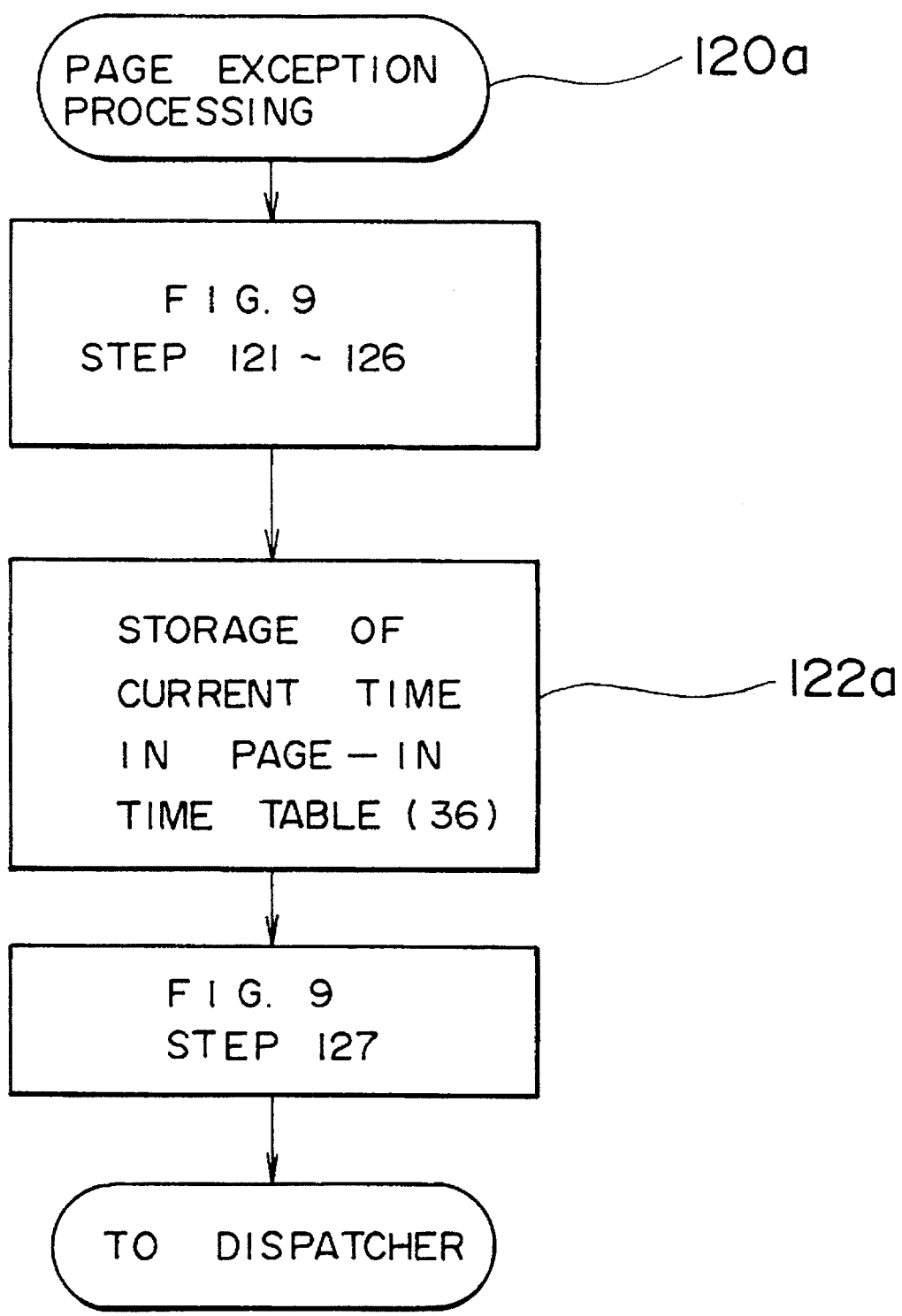
FIG. 17 is a flow chart for illustrating another example of page exception processing executed in the system shown in FIG. 1.

FIG. 17 is a flow chart showing a page exception processing program 120a, which differs from the page exception processing 120 shown in FIG. 9 in that the current time information is stored in the page-in time table 36 on the main storage (2) upon completion of the page inputting processing (step 122a).

The instant embodiment is advantageous in that CPU overhead can be reduced.

Figure 18:
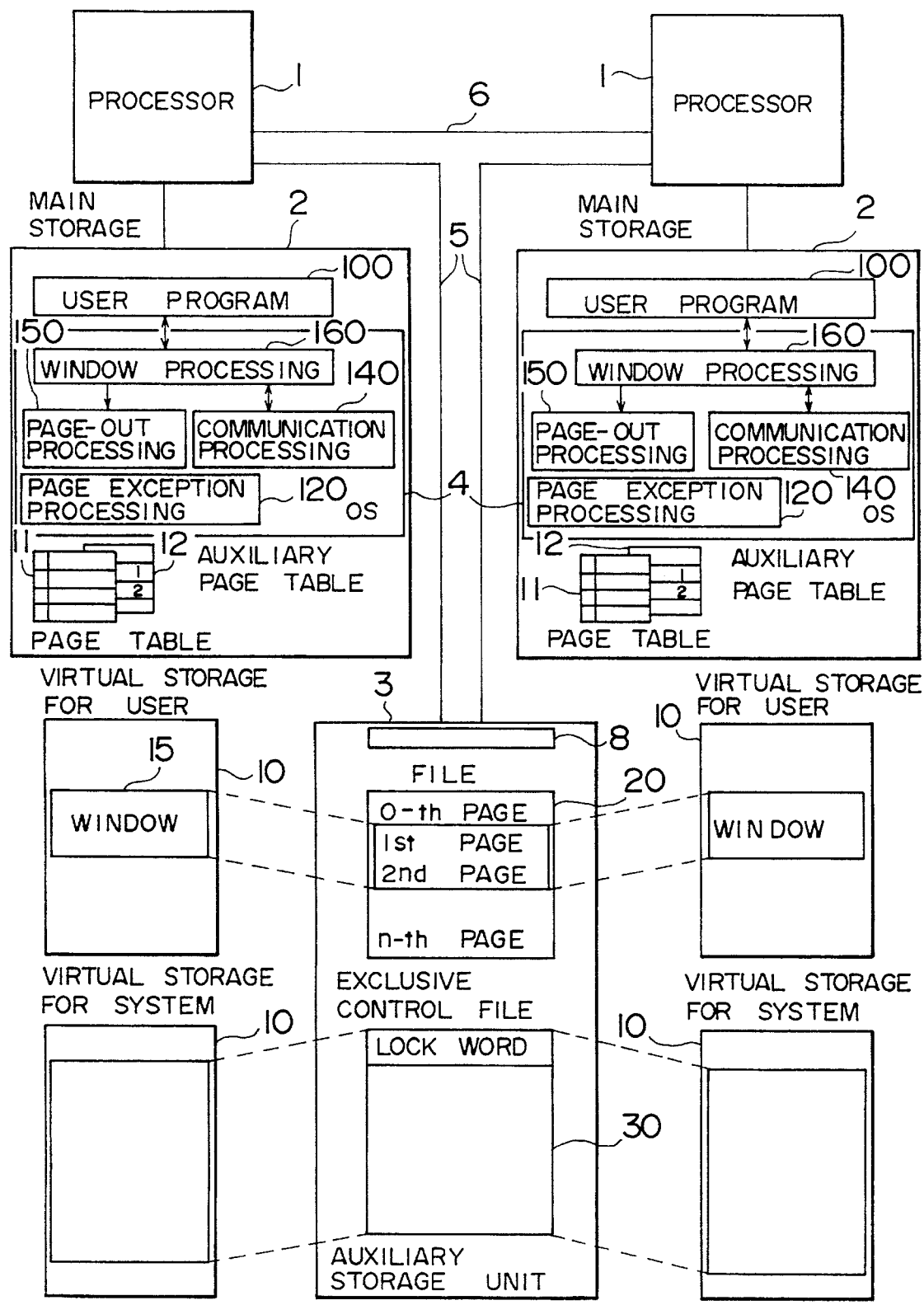
FIG. 18 is a block diagram showing another embodiment of the file sharing system according to the invention.

FIG. 18 shows another embodiment of the present invention, in which like reference numerals as those used in FIG. 1 denote like or equivalent parts.

In FIG. 18, a numeral 150 denotes a window and 160 denotes a window processing.

According to the teachings of the invention incarnated in this embodiment, only the window 15 representing an area on the virtual storage 10 which is smaller than the file 20 and a file area designated by the operand of the access macroinstruction ACCESS issued before a user program 100 refers to and/or updates the file are mapped to the virtual storage 10 through a window processing 160, whereby the file areas not accessed by the user program 100 are inhibited from being referred to. With this arrangement, the file can be protected against destruction due to a possible fault in the user program.

The instant embodiment will be described in detail by reference to FIGS. 19 and 20.

Figure 19:
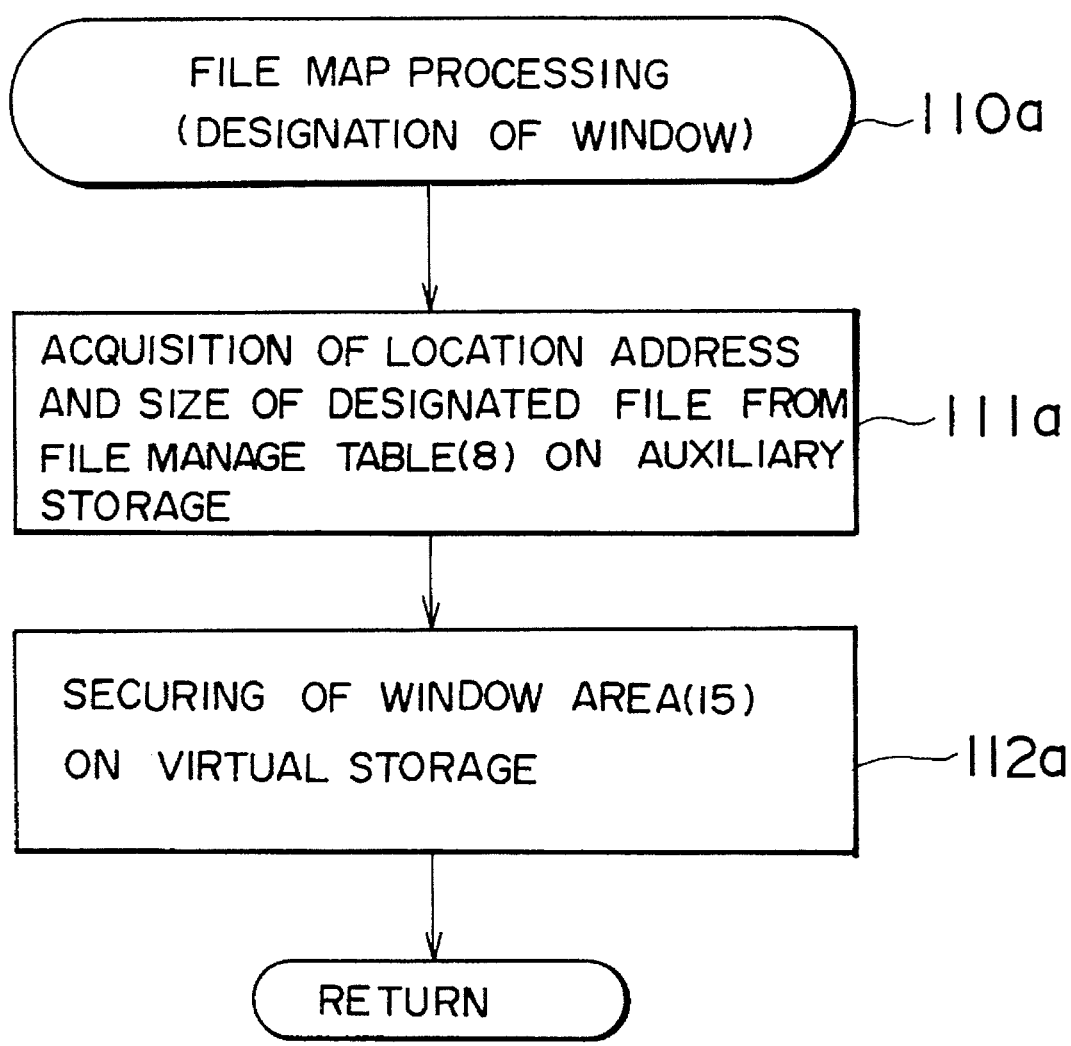
FIG. 19 is a flow chart for illustrating a file map processing executed in the system shown in FIG. 18.
Figure 20:
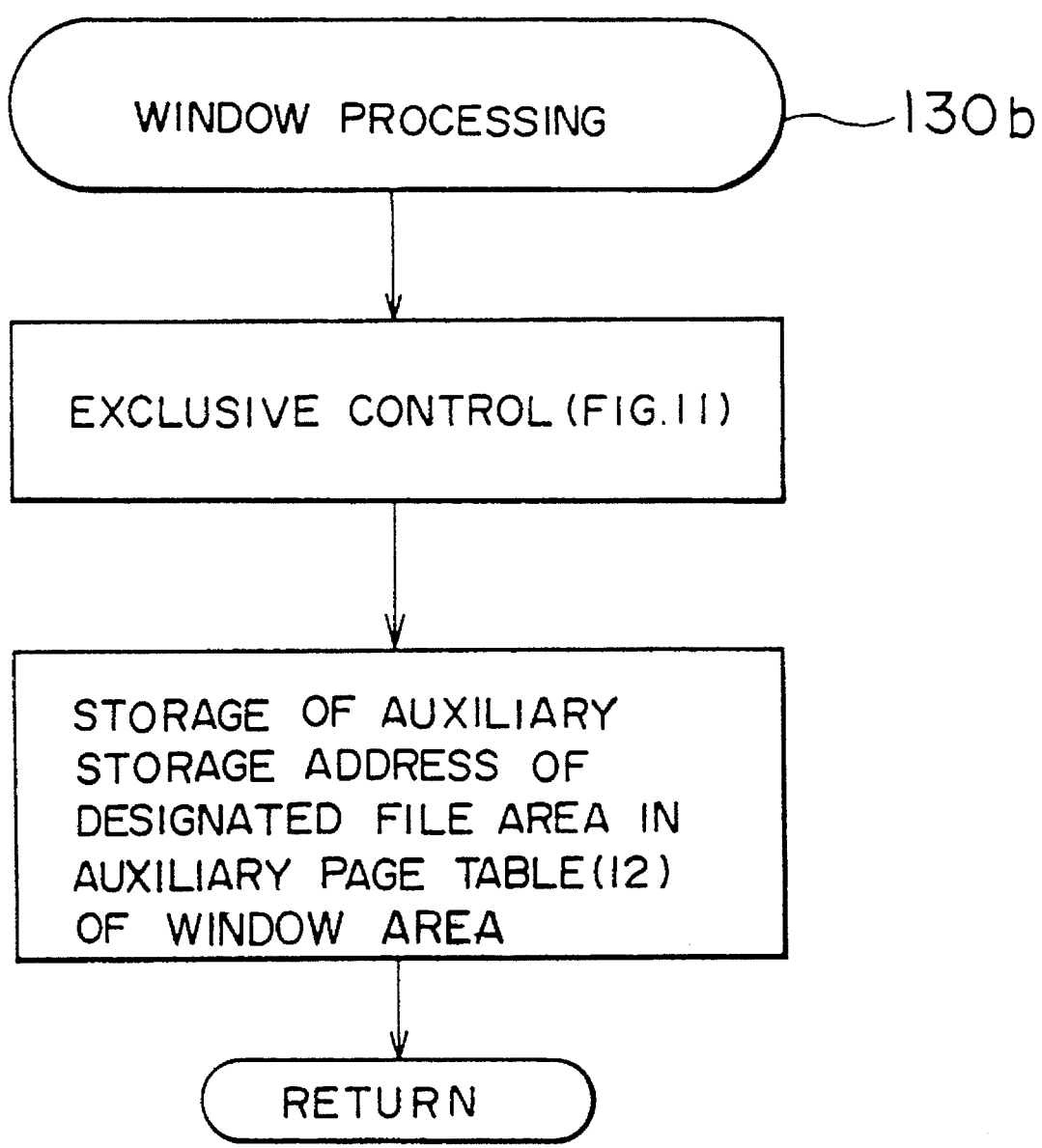
FIG. 20 is a flow chart for illustrating a window processing executed in the system shown in FIG. 18.

FIG. 19 is a flow chart showing the file mapping processing (110a).

In this file mapping processing, only determination of file location information (step 111a) and securing of the window area on the virtual storage 10 (step 112a) are performed without updating the auxiliary page table.

The window processing (program) 130b is activated upon issuance of the access macroinstruction ACCESS by a user program 100. After having executed the exclusive control processing 130 shown in FIG. 11, the location address of the file area which the user refers to is stored in the auxiliary page table within the window 15.

According to the instant embodiment, only the area of the file to which the access request is issued by the user program 100 is mapped onto the virtual storage, and the other file areas are inhibited from being referenced by the user program 100. Thus, the file can be protected against destruction due to a possible fault of the user program 100.

Figure 21:
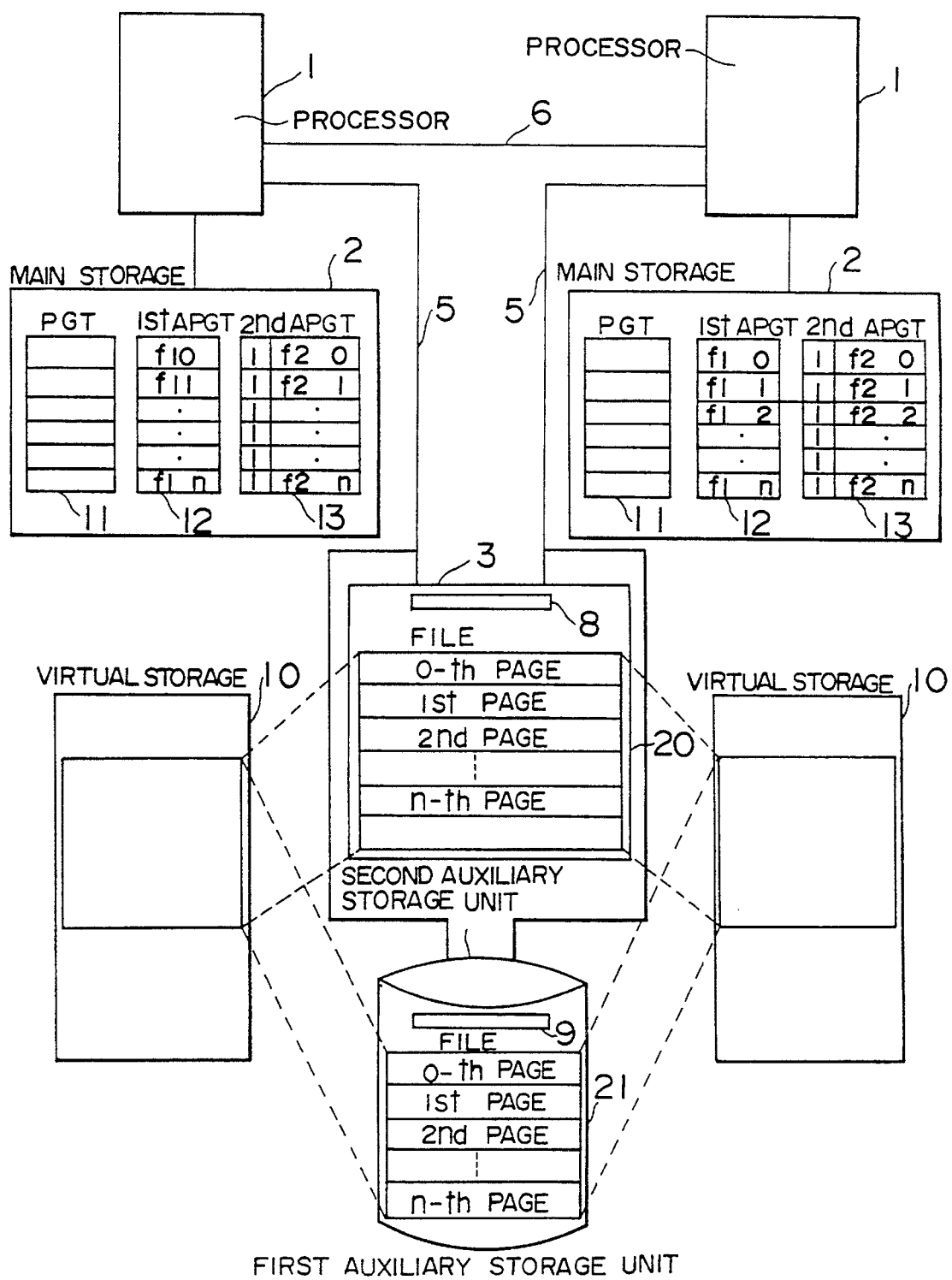
FIG. 21 is a block diagram showing yet another embodiment of the file sharing system according to the invention.

FIG. 21 shows yet another embodiment of the present invention.

In FIG. 21, like reference numerals as those used in FIG. 1 denote like or equivalent parts as those shown in FIG. 1.

In FIG. 21, a reference numeral 7 denotes a first auxiliary storage unit, 3 denotes a second auxiliary unit, 21 denotes a file on the first auxiliary storage unit, 20 denotes a file on the second auxiliary storage unit, 12 denotes a first auxiliary page table and 13 denotes a second auxiliary page table.

According to the teaching of the invention incarnated in the instant embodiment, the file 21 on the first auxiliary storage unit 7 is disposed on a page-by-page basis in the file 20 on the second auxiliary storage unit 3 having a higher access speed than the first auxiliary storage unit, to thereby speed up the paging processing in the exclusive control. Further, rewriting to the file 21 is effected at a time point when a save macroinstruction SAVE is issued from the user program 100. Besides, it is to be mentioned that when a given processor disposes a page of the file 21 on the low-speed storage unit onto the file 20 of the high speed storage unit, any other processor requesting the reference to the same page reads necessarily the page from the file 20 on the high-speed storage unit.

Details of the instant embodiment will now be described by reference to FIG. 6, FIG. 7 and FIGS. 22 to 26.

Figure 6:
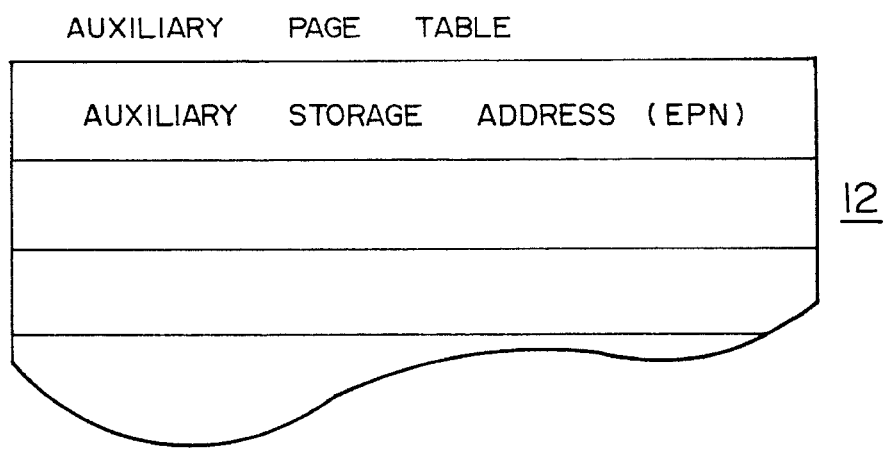
FIG. 6 shows a structure of a table for storing location addresses of an auxiliary storage unit where pages are placed.
Figure 7:
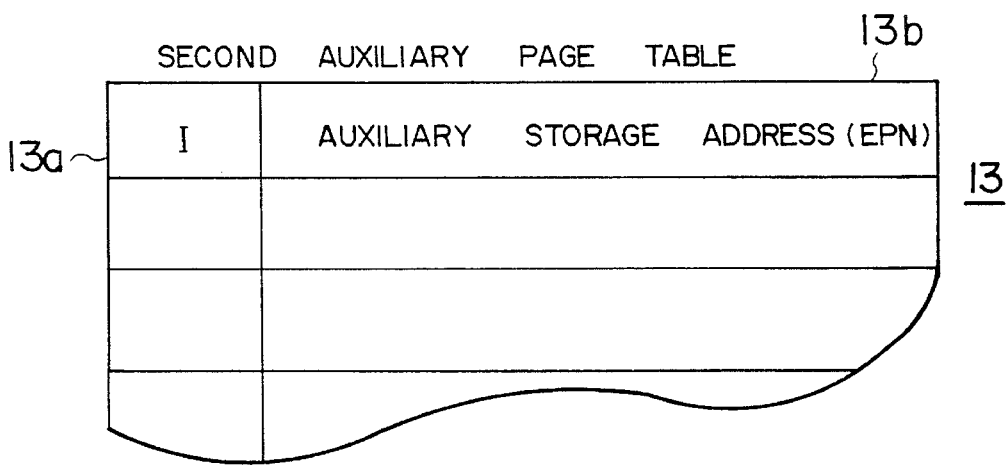
FIG. 7 is a view showing a structure of a table for storing location addresses of a high speed auxiliary storage unit where pages are stored.

The first auxiliary page table 12 has the same structure as the auxiliary page table shown in FIG. 6. The second auxiliary page table 13 has a structure shown in FIG. 7. In the figures, 13b denotes a field for storing the auxiliary storage address and 13a denotes an I-bit field containing an I bit indicating whether or not the associated auxiliary storage address field is valid. More specifically, when the I bit 13a is "0", this indicates that the auxiliary storage address field 13b is valid, while the I bit of "1" indicates that the address field 13b is invalid.

Figure 22:
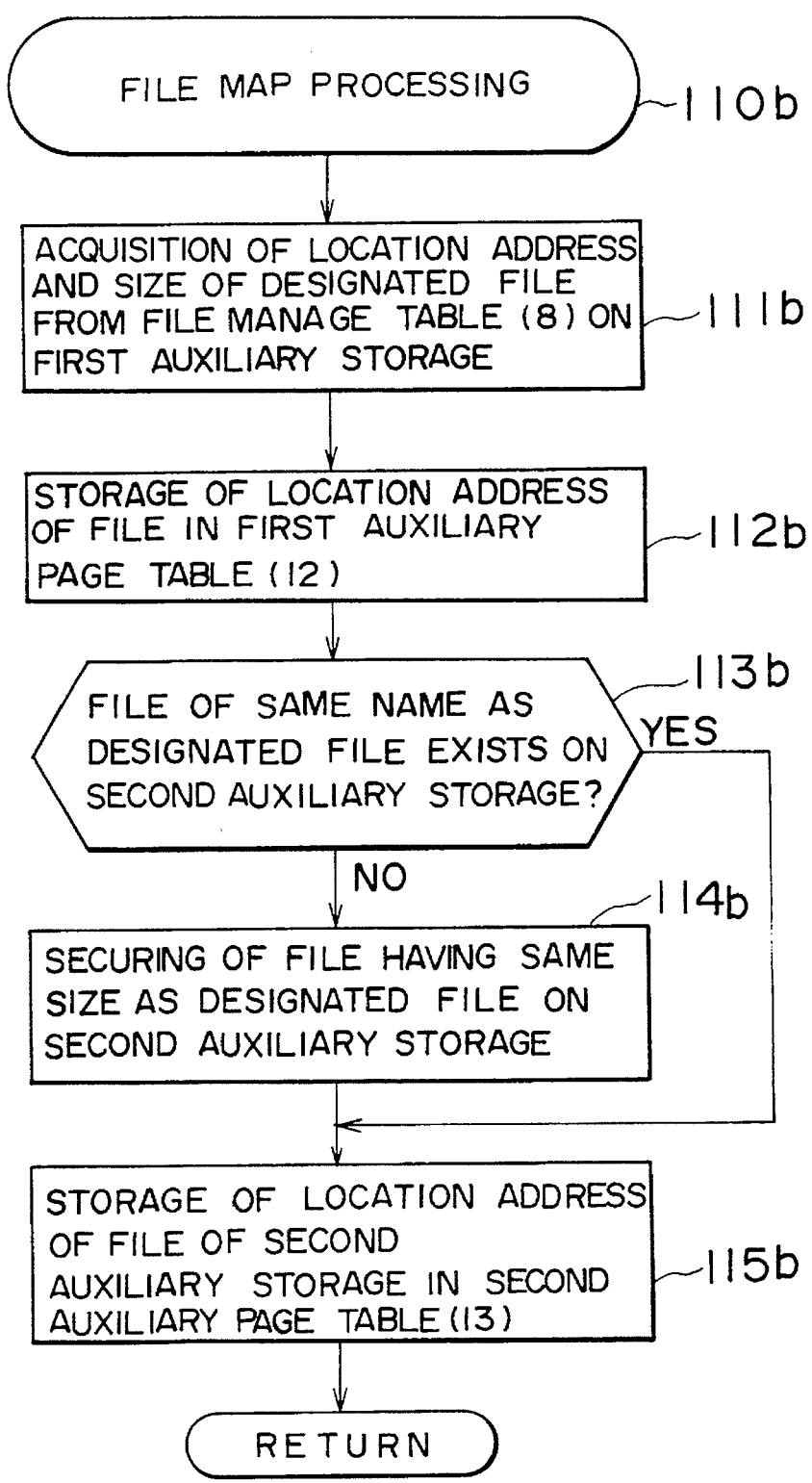
FIG. 22 is a flow chart for illustrating a file map processing executed in the system shown in FIG. 21.

FIG. 22 is a flow chart illustrating the file mapping processing (program) 110b.

As in the case of the other embodiments described hereinbefore, the file mapping processing 110b is activated in response to issuance of the macroinstruction FILEMAP by a user program 100. With this file mapping processing 110b, the file name designated by an operand of the macroinstruction FILEMAP is determined, whereon the location information of the file 21 is determined by consulting the file manage table 9 on the first auxiliary storage unit 7 (step 111b). Subsequently, the address of the file is stored in the first auxiliary page table 12 on the main storage 2 (step 112b). Next, it is checked whether or not a file of the same name as that designated by the user program 100 is present in the file manage table 8 on the second auxiliary storage (step 113b).

Unless the file of the same name exists on the second auxiliary storage unit 3, a file 20 of the same name and a same length as the file 21 is prepared on the second auxiliary storage unit 3 (step 114b).

On the other hand, when the file of the same name exists on the second auxiliary storage unit 3, the step 114bis skipped, because the allocation processing of this file 20 has already been performed by another processor.

Finally, the location address of the file 20 on the second auxiliary storage 3 is stored in the second auxiliary page table 13, whereon the I bit 13a is set to "1" (invalidated) at a step 115b.

Figure 23:
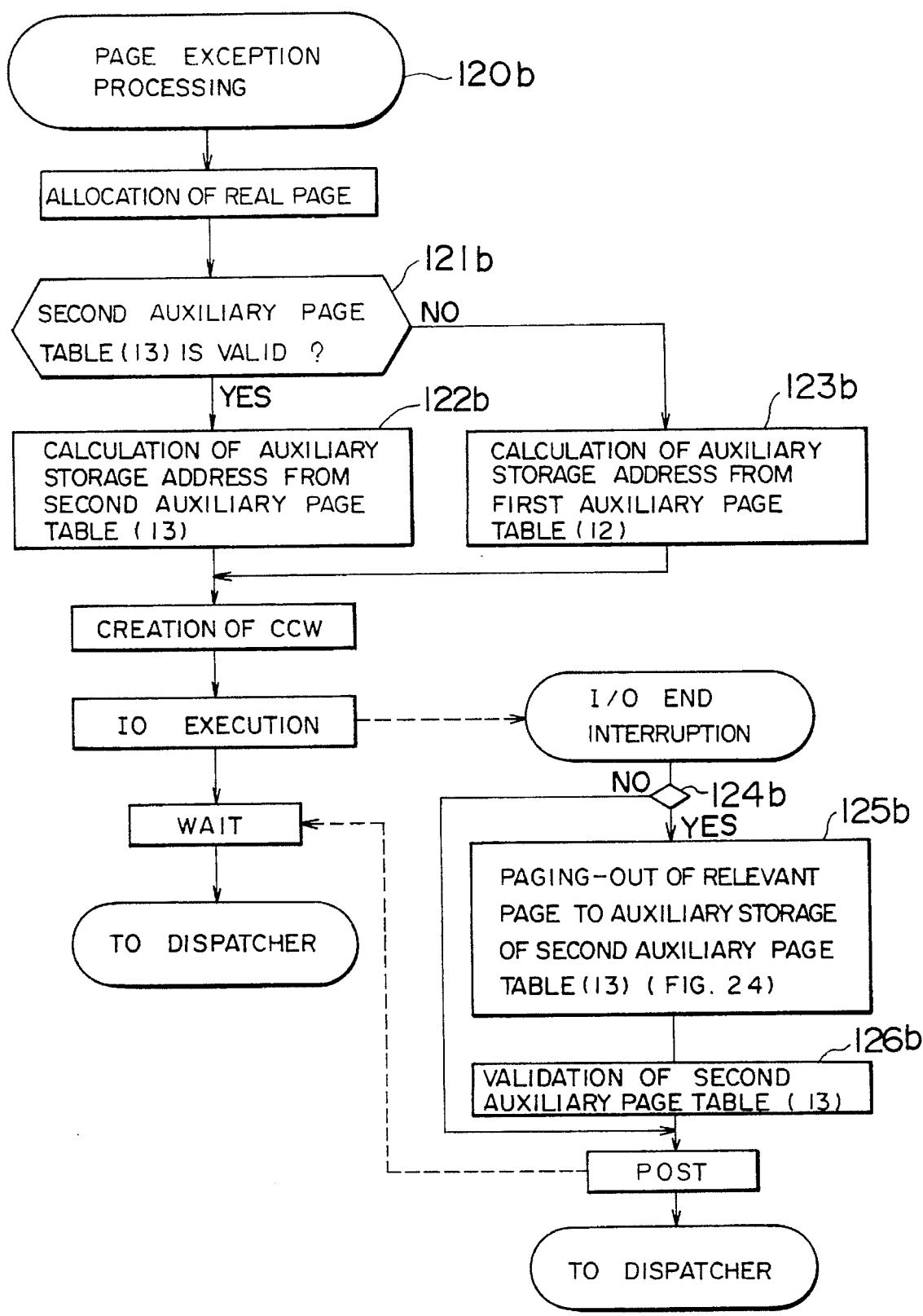
FIG. 23 is a flow chart for illustrating a page exception processing executed in the system shown in FIG. 21.

FIG. 23 is a flow chart illustrating the page exception processing 120b.

This page exception processing program 120b is executed in case the page of concern does not exist on the main storage 2 when reference is made to the file mapping area by the user program 100. In other words, the page exception processing program 120b is activated when the I bit 11a of the page table 11 assumes "1".

In the page exception processing 110a, the I-bit field 13a of the second auxiliary page table 13 is referred to for thereby checking whether or not the auxiliary storage address of the second auxiliary page table 13 is valid (step 121b). If this address is valid, i.e. when the value of the I bit is "0", the address for page-in is determined from the auxiliary storage address of the second auxiliary page table (step 122b).

On the other hand, when the auxiliary storage address mentioned above is invalid, i.e. when the value of the I bit is "1", the page-in address is determined from the auxiliary storage address of the first auxiliary page table (step 123b).

After completion of the page-in operation, the page as paged-in is paged out to the second auxiliary storage unit 3 when the page-in address has been determined from the first auxiliary page table 12 (step 124b), whereon the value of the I bit 13a of the second auxiliary page table 13 is set to "0" to thereby validate the second auxiliary page table.

Thereafter, the same page is referred to in the associated or same processor, and when the page exception takes place, the paging-in is performed from the second auxiliary storage unit 3 permitting the access at a higher speed.

The processing for setting the I bit 13a of the second auxiliary page table 13 indicating the same file on another processor is effectuated through a page-out processing 150a and a communication processing 140a.

Figure 24:
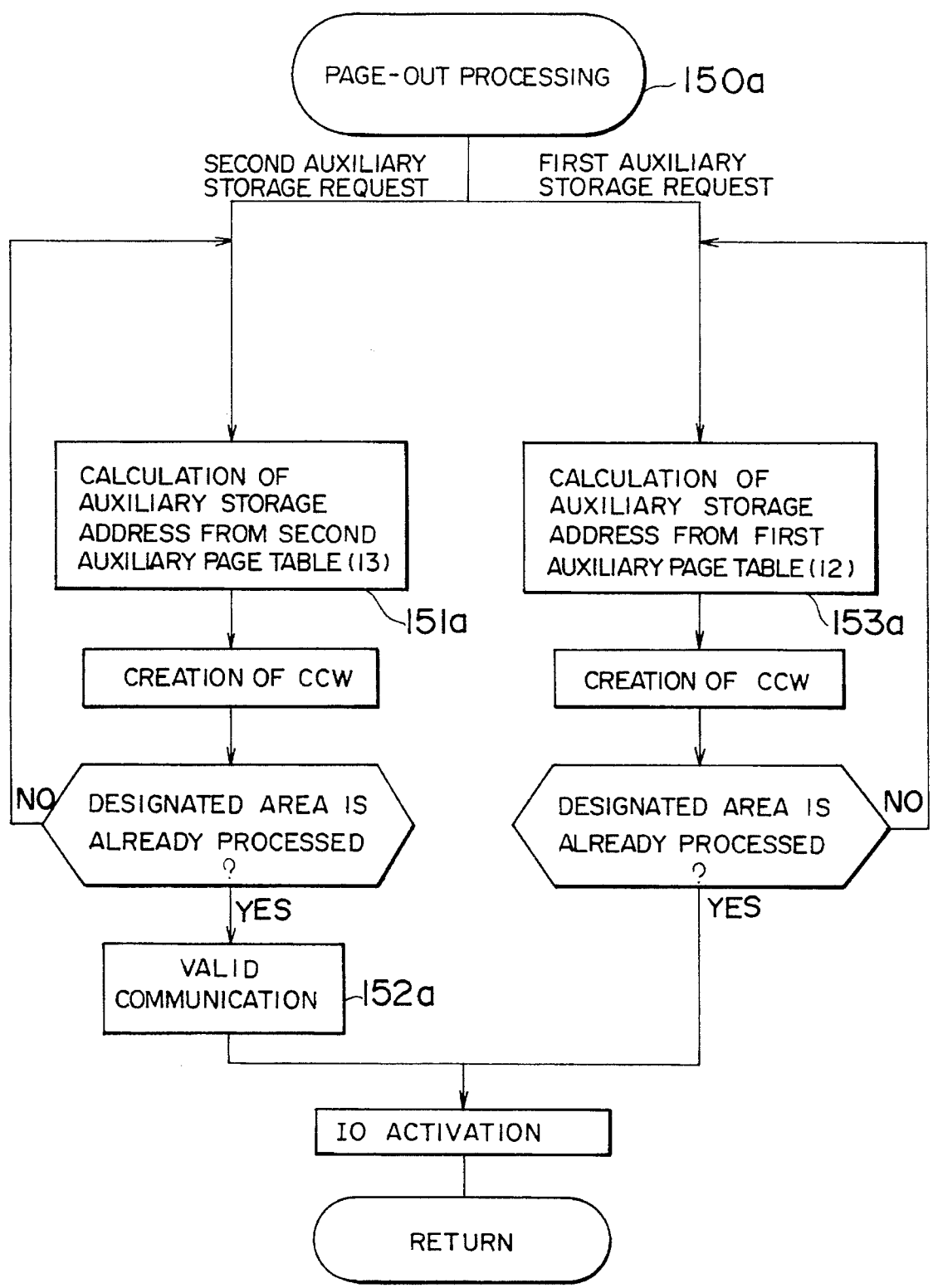
FIG. 24 is a flow chart for illustrating a page-out processing executed in the system shown in FIG. 21.

First, description will be directed to the page-out processing by referring to FIG. 24.

The objective of the page-out processing 150a differs in dependence on whether the page-out request is issued to the first auxiliary storage unit 7 or the second auxiliary storage unit 3. The page-out request issued by the page-out processing is only for the second auxiliary storage unit 3. The page-out processing for the second auxiliary storage unit 3 is accomplished by determining the auxiliary storage address stored in the second auxiliary page table 13 (step 151a).

For validating the second auxiliary page table of another processor, a validating communication processing VALID is activated (step 152a).

Figure 25A:
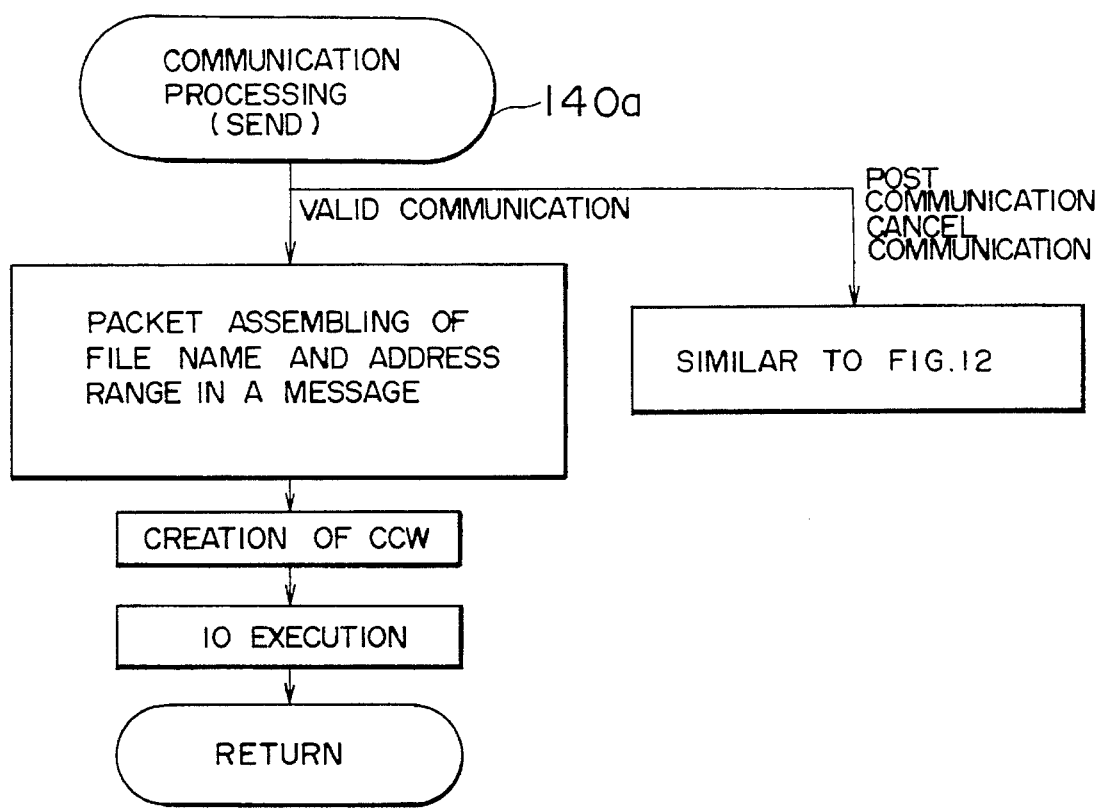
FIGS. 25A and 25B are flow charts for illustrating communication processings executed in the system shown in FIG. 21.
Figure 25B:
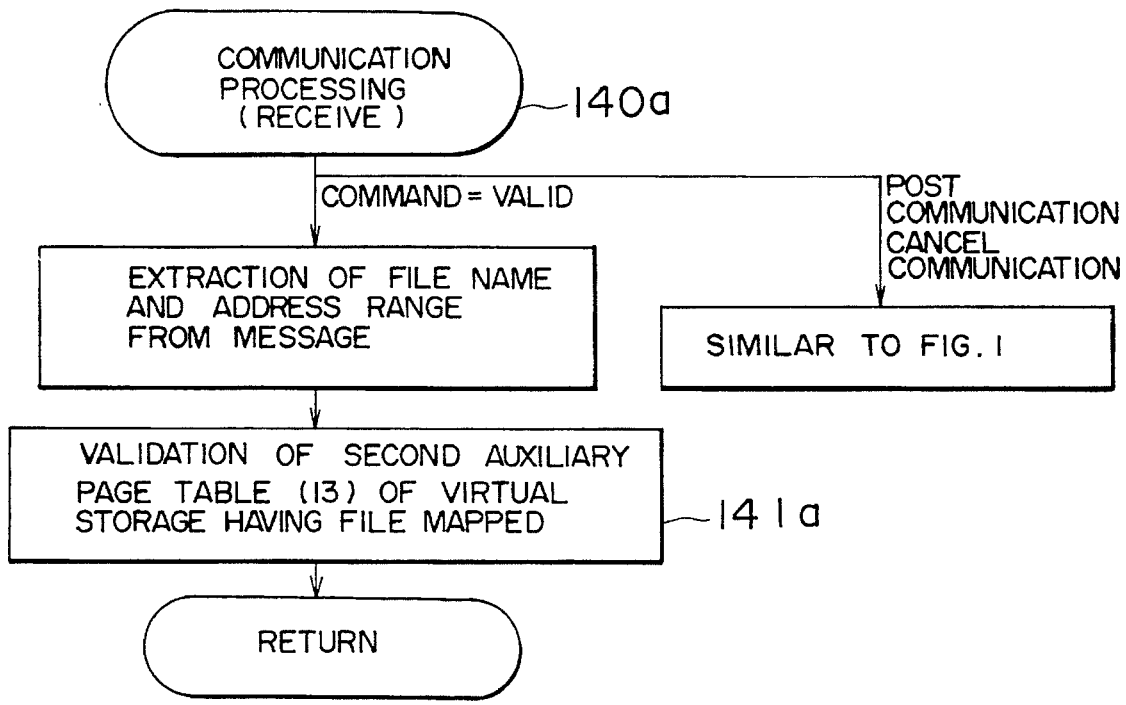

The validating communication processing VALID is illustrated in FIGS. 25A and 25B. Upon reception of the validating communication request, a communication processing program (140a) stores in a message a validation command VALID, a file name and an address range to thereby enable the inter-processor communication channel 6.

The processor receiving this message executes a processing step 141a because of the validation command VALID. More specifically, the I bit of the second auxiliary page table 13 of the virtual storage having the file designated by the message mapped thereto is set to "0" to thereby validate the second auxiliary page table 13.

As a result of this, the same file area referred to by the other processor can be paged in from the high-speed auxiliary storage unit 3.

The exclusive control processing 130 is performed substantially in the same manner as the processing described previously by reference to FIG. 11. Accordingly, repeated description thereof will be unnecessary. Through the processings described above, it is possible to make access to a file at a high speed without incurring any conflict even when the file is to be updated by using the second auxiliary storage unit 3 allowing the access to be made at a higher speed than the first auxiliary storage unit 7 on which the file 21 is stored.

According to the scheme now under discussion, the file having the content updated is not rewritten in the original first auxiliary storage unit 7, thus providing possibly an inconvenience.

To evade such inconvenience, a saving macroinstruction SAVE is provided in association with the user program 100 for allowing the file to be written back into the first auxiliary storage unit 7.

Processing of the macroinstruction SAVE will be explained below by reference to FIG. 26 along with FIG. 24.

FIG. 26 is a flow chart showing a flow of the save processing (SAVE) 160.

This processing 160 is activated in response to issuance of the macroinstruction SAVE by a user program 100.

With this save processing 160, the whole area of a file is set to a shared access state so that other programs are inhibited from updating the file (step 16A).

Subsequently, a page-out request is issued to the first auxiliary storage unit 7 (step 162). After completion of the page-out processing, the shared access request is released (step 163).

Next, description will be directed to the page-out processing (150a) by reference to FIG. 24.

In the case of the page-out request for the first auxiliary storage unit 7, a processing step 153a is executed. At this step 153a, since the auxiliary storage address is arithmetically determined from the first auxiliary page table 2, the paging-out is made to the first auxiliary storage unit 7, whereby rewriting (writing-back) to the original file 2 can be accomplished.

As will now be appreciated from the foregoing description, according to the teachings of the invention incarnated in the illustrative embodiments described above, there can be achieved a higher file access speed when compared with the hitherto known file access method by virtue of such arrangement that correspondence is established between the file on the auxiliary storage unit and the virtual storage on the page-by-page basis, wherein upon reference of a file page by a user program, the file is transferred from the auxiliary storage unit to the main storage through the page exception processing.

Further, by disposing the file on the extended storage unit, a file access can be realized at a higher speed when compared with the file access method known heretofore.

Besides, a shared file can be accessed without incurring any conflict when a file shared by a plurality of processors of a loosely coupled multiprocessor (LCMP) system is to be updated, owing to such arrangement that the exclusive control processing function is imparted to each of the processors, wherein upon completion of the exclusive access processing, a message for invalidating the updated page is issued to the individual processors, respectively, to thereby allow the processors receiving the message to invalidate the page.

By limiting the range of the file mapped to the virtual storage to the area which is requested by a user program, the file can be protected against destruction due to a fault in the user program.

Besides, by disposing on the high-speed auxiliary storage unit only the area of the file of the low-speed auxiliary storage that has been referred to and/or updated, the access to the shared file can be speeded up.

Thus, there can be achieved higher file access speed when compared with the hitherto known file access method owing to the arrangement that correspondence is established between the file on the auxiliary storage unit and the virtual storage on the page-by-page basis, wherein upon reference of a page of a file by a user program, the file is transferred to the main storage from the auxiliary storage unit through the page exception processing.

We claim:

1. In a multiprocessor system in which an auxiliary storage unit is shared in use by a plurality of processors each adopting a virtual storage management, a file sharing method, comprising the steps of:

preparing on each of a plurality of main storages, each main storage being provided for a respective one of said plurality of processors, a page table for storing on a page-by-page basis a real address in said main storage of a file designated by a program and transferred to said main storage in correspondence to a virtual address issued by said program for designating said file;

preparing on said main storage an auxiliary page table for storing on a page-by-page basis addresses of files contained in said auxiliary storage unit;

preparing on said main storage a page-in time table for storing a page-in time at which the content of said file is transferred from said auxiliary storage unit to said main storage;

preparing on said auxiliary storage unit an exclusive control manage table storing management information for managing one of exclusive use control and shared use control for an access made to said file stored in said auxiliary storage unit;

preparing on said auxiliary storage unit an exclusive use end time table for storing a time at which the exclusive use of said file by said program inhibiting the shared use of said file by another program is completed;

responding to a file map request issued by said program for thereby storing on the page-by-page basis in said auxiliary page table an address of said file which is stored in said auxiliary storage unit and which is designated by said file map request;

responding to a page exception interruption occurring when said file is not stored in said main storage for thereby referring to the page-based address of said file stored in said auxiliary page table to thereby transfer said file to said main storage from said auxiliary storage unit and storing the time of said transfer in said page-in time table;

responding to the end of the exclusive use of said file by said program to thereby transfer said file from said main storage to said auxiliary storage unit and store the time of said transfer in both of said exclusive use end time table and said page-in time table; and responding to a use request of said file issued by said program to thereby refer to said exclusive control manage table;

wherein when it is found as the result of said reference to said exclusive control manage table that the time stored in said exclusive use end time table is more recent than the time stored in said page-in time table, a real address corresponding to said file is invalidated.

2. A file sharing system for a multiprocessor system including a plurality of interconnected processors, comprising:

an auxiliary storage unit storing files addressed on a page-by-page basis and an exclusive control manage table for storing management information for managing one of exclusive use control and shared use control for an access made to said file and an exclusive use end time table containing a time at which the exclusive use of said file is ended; and a plurality of main storages, each main storage being provided for a respective one of said processors, for storing an auxiliary page table for holding the address of said file in said auxiliary storage unit, a page table for storing on a page-by-page basis a real address of said file transferred from said auxiliary storage unit in correspondence with a virtual address issued by a program for designating said file, and a page-in time table for storing a page-in time at which content of said file is transferred from said auxiliary storage unit;

wherein each of said plural processors includes:
(a) means for executing a program;
(b) means responsive to a file map request issued by said program for thereby storing in said auxiliary page table on the page-by-page basis the address of a file which is designated by said file map request and which is stored in said auxiliary storage unit;
(c) means responsive to a page exception interruption occurring when said file is not stored in said main storage for thereby referring to the page-based address of said file stored in said auxiliary page table to thereby transfer said file to said main storage from said auxiliary storage unit and store the time of said transfer in said page-in time table;
(d) means responsive to the end of the exclusive use of said file by said program to thereby transfer said file from said main storage to said auxiliary storage unit and store the time of said transfer in both of said exclusive use end time table and said page-in time table; and
(e) means responsive to a use request of said file issued by said program to thereby refer to said exclusive control manage table, wherein when it is found as the result of said reference to said exclusive control manage table that said designated file can be used and that the time stored in said exclusive use end time table is more recent than the time stored in said page-in time table, the real address stored in said page table and corresponding to said file is invalidated, said means (a), (b), (c), (d) and (e) being connected to said auxiliary storage unit and said main storages.

* * * * *